(12) United States Patent
Zhu et al.

(10) Patent No.: US 10,944,753 B2
(45) Date of Patent: Mar. 9, 2021

(54) IOT DEVICES WIRELESS NETWORK CONNECTIVITY POLICY MANAGEMENT

(71) Applicant: Verizon Patent and Licensing Inc., Arlington, VA (US)

(72) Inventors: Lily Zhu, Parsippany, NJ (US); Musa Kazim Guven, Basking Ridge, NJ (US); Jeremy Nacer, Denville, NJ (US); Xin Wang, Morris Plains, NJ (US); Zhengfang Chen, Millburn, NJ (US); Hakan Alparslan, Middletown, NJ (US); Christopher M. Schmidt, Branchburg, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 157 days.

(21) Appl. No.: 15/679,639

(22) Filed: Aug. 17, 2017

(65) Prior Publication Data
US 2019/0058711 A1 Feb. 21, 2019

(51) Int. Cl.
| | |
|---|---|
| *H04L 29/06* | (2006.01) |
| *H04L 29/08* | (2006.01) |
| *H04W 4/70* | (2018.01) |
| *H04L 12/26* | (2006.01) |
| *H04L 12/24* | (2006.01) |
| *G06F 21/62* | (2013.01) |
| *H04W 4/50* | (2018.01) |

(52) U.S. Cl.
CPC ........ *H04L 63/102* (2013.01); *H04L 43/0876* (2013.01); *H04L 63/20* (2013.01); *H04L 67/125* (2013.01); *H04L 67/303* (2013.01); *H04L 67/306* (2013.01); *H04W 4/70* (2018.02); *G06F 21/6236* (2013.01); *H04L 41/08* (2013.01); *H04W 4/50* (2018.02)

(58) Field of Classification Search
CPC ... G06F 21/6236; H04L 41/08; H04L 63/102; H04L 63/20; H04L 67/306; H04W 4/70
See application file for complete search history.

(56) References Cited

U.S. PATENT DOCUMENTS

| | | | |
|---|---|---|---|
| 8,737,989 B2* | 5/2014 | Luft | H04W 24/08 455/432.3 |
| 9,774,604 B2* | 9/2017 | Zou | H04L 63/102 |
| 9,826,564 B2* | 11/2017 | Kweon | H04W 4/60 |
| 9,871,865 B2* | 1/2018 | Shaashua | H04W 4/70 |
| 10,051,068 B2* | 8/2018 | Sharma | H04L 67/26 |

(Continued)

OTHER PUBLICATIONS

Search Query Report from Innovation Plus Database (performed Feb. 18, 2020).*

(Continued)

*Primary Examiner* — Sharon S Lynch

(57) ABSTRACT

A network device receives parameters associated with a usage profile of at least one Internet of Things (IoT) device, where the usage profile specifies a data usage pattern associated with the at least one IoT device transmitting or receiving data via a wireless network. The network device generates a device behavior profile based on the parameters associated with the usage profile, and causes the device behavior profile and an application to be sent to the at least one IoT device, where the application controls the at least one IoT device's transmission or reception via the wireless network using the device behavior profile.

20 Claims, 16 Drawing Sheets

(56) References Cited

U.S. PATENT DOCUMENTS

| | | | | |
|---|---|---|---|---|
| 10,171,586 B2* | 1/2019 | Shaashua | | H04W 4/70 |
| 10,353,939 B2* | 7/2019 | Shaashua | | G06N 5/04 |
| 10,516,540 B2* | 12/2019 | Yang | | H04L 9/3247 |
| 2010/0057485 A1* | 3/2010 | Luft | | H04W 4/70 |
| | | | | 455/411 |
| 2012/0278490 A1* | 11/2012 | Sennett | | H04W 4/70 |
| | | | | 709/227 |
| 2013/0132854 A1* | 5/2013 | Raleigh | | G06F 3/0482 |
| | | | | 715/738 |
| 2013/0227036 A1* | 8/2013 | Kang | | H04L 65/40 |
| | | | | 709/206 |
| 2014/0344451 A1* | 11/2014 | Luft | | H04W 4/70 |
| | | | | 709/224 |
| 2015/0019342 A1* | 1/2015 | Gupta | | G06Q 10/20 |
| | | | | 705/14.66 |
| 2015/0105044 A1* | 4/2015 | Maguire | | H04L 67/16 |
| | | | | 455/406 |
| 2015/0143456 A1* | 5/2015 | Raleigh | | H04L 63/20 |
| | | | | 726/1 |
| 2016/0212099 A1* | 7/2016 | Zou | | H04L 63/0263 |
| 2016/0226847 A1* | 8/2016 | Bone | | G06F 13/1689 |
| 2016/0342906 A1* | 11/2016 | Shaashua | | H04L 67/22 |
| 2016/0374134 A1* | 12/2016 | Kweon | | H04W 4/60 |
| 2017/0078886 A1* | 3/2017 | Raleigh | | H04W 12/08 |
| 2017/0177798 A1* | 6/2017 | Samuel | | G06F 21/6254 |
| 2017/0222991 A1* | 8/2017 | Yang | | H04L 9/3247 |
| 2017/0235585 A1* | 8/2017 | Gupta | | G06F 9/45558 |
| | | | | 718/1 |
| 2017/0238129 A1* | 8/2017 | Maier | | H04W 4/14 |
| | | | | 455/404.2 |
| 2017/0272930 A1* | 9/2017 | Jiang | | H04W 8/02 |
| 2017/0332274 A1* | 11/2017 | Link, II | | H04W 76/11 |
| 2018/0007058 A1* | 1/2018 | Zou | | H04L 63/0263 |
| 2018/0077449 A1* | 3/2018 | Herz | | H04W 4/38 |
| 2018/0115885 A1* | 4/2018 | Berzin | | H04W 8/18 |
| 2018/0270188 A1* | 9/2018 | Kodaypak | | H04L 51/38 |
| 2018/0302440 A1* | 10/2018 | Hu | | H04L 63/20 |
| 2018/0373555 A1* | 12/2018 | Gupta | | G06F 9/45558 |
| 2018/0375887 A1* | 12/2018 | Dezent | | H04L 63/1425 |
| 2018/0376325 A1* | 12/2018 | Xu | | H04W 8/245 |
| 2019/0019249 A1* | 1/2019 | Bhattacharjee | | G06Q 40/025 |
| 2019/0028865 A1* | 1/2019 | Raleigh | | H04W 4/50 |
| 2019/0268755 A1* | 8/2019 | Namiranian | | H04W 8/183 |
| 2020/0280839 A1* | 9/2020 | Ahmed | | H04W 8/18 |

OTHER PUBLICATIONS

Search Query Report from IP.com (performed Jul. 15, 2020) (Year: 2020).*

Search Query Report from IP.com (performed Oct. 29, 2020) (Year: 2020).*

\* cited by examiner

Internet of Things Device(s) — 600

Data Quantity Per Transmission — 640
- ☐ <0.1 kB
- ☐ 0.1kB–0.5kB
- ☑ 0.6kB–1.0kB
- ☐ 1.1kb–1.5kB
- ☐ 1.6kB–2.0kB
- ☐ 2.1kB–5kB
- ☐ 5.1kB–10kB
- ☐ >10kB

Frequency of Data Transmission — 655
- ☐ 1-4/month
- ☐ 5-15/month
- ☐ 1/day
- ☑ 2-4/day
- ☐ 5-15/day
- ☐ >15/day

Services — 660
- ☐ Voice
- ☑ Data
- ☐ SMS

Mobility of Device(s) — 645
- ☑ Fixed
- ☐ Mobile
- ☐ Mostly fixed
- ☐ Mostly Mobile

Signal Coverage Requirement — 665
- ☑ Normal Coverage
- ☐ 5dB Coverage Extension
- ☐ 10dB Coverage Extension
- ☐ 15dB Coverage Extension
- ☐ 20dB Coverage Extension

Time of Transmission(s) — 650
- ☐ 7am-12pm
- ☐ 12pm-5pm
- ☑ 5pm-10pm
- ☐ 10pm-3am
- ☑ 3am-7am

Device Power Considerations — 670
- ☐ Limited Battery
- ☐ Battery
- ☑ Continuous external power

[Submit]

FIG. 6B

IOT DEVICES WIRELESS NETWORK CONNECTIVITY POLICY MANAGEMENT

BACKGROUND

The "Internet of Things" (IoT) is a network of physical devices (i.e., "things") where the devices are specially designed for a specific function, unlike general computing devices like a desktop or laptop computer. IoT devices, or "machine-to-machine" (M2M) devices, are embedded with electronics and network connectivity components that enable these devices to collect, store and exchange data. The types of network connectivity may include, for example, Bluetooth connectivity, Wi-Fi connectivity, and/or cellular network connectivity. An IoT device may additionally have computational capability, with various types of installed software (e.g., apps), and may also include one or more of various types of sensors. IoT sensors may include, for example, temperature sensors, humidity sensors, pedestrian sensors, smoke detectors, vehicle sensors, proximity sensors, motion detectors, and open/close door sensors. As an example, the IoT sensors may be used by meteorologists to predict the weather; in "smart cities" to time traffic lights and detect traffic accidents; by emergency services to detect forest fires; or by homeowners to detect intruders or house fires.

An IoT device may, via the network connectivity, be controlled remotely across existing wireless network infrastructure. An IoT device may use the wireless network connectivity to communicate with other IoT devices, or with certain nodes (e.g., a particular server or computer) across the wireless network and/or a public network (e.g., the Internet). The expected number of IoT devices is anticipated to impose increasing demands upon the wireless network(s) serving the IoT devices.

BRIEF DESCRIPTION OF THE DRAWINGS

FIGS. 6A and 6B are diagrams that depict an exemplary user interface for providing data associated with a network subscription for a group of Internet of Things devices, and for providing parameters associated with a network usage pattern of the Internet of Things devices;

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein enable subscribers to identify and provide parameters associated with a network usage pattern of Internet of Things (IoT) devices that they desire to receive network service from a wireless network, such as wireless service(s) provided by a mobile network (i.e., a cellular communications network). Upon submission of the network usage pattern for the IoT devices by a subscriber, as a usage profile, a network device uses various types of data, including expert knowledge of the wireless network, to generate one or more service pricing plans for the IoT devices to connect with, and use, the wireless network, where the generated service pricing plan(s) is based on requirements of the wireless network to satisfactorily service the network usage pattern of the IoT devices.

Upon selection of a service pricing plan by the subscriber, the network device generates a device behavior profile based on the usage profile and based on the selected service pricing plan. The device behavior profile details specific parameters associated with the IoT devices' network access, network coverage, network service requirements, and/or IoT device configuration settings that are determined from the subscriber-provided usage profile. The network device further generates a set of policy rules for controlling the connectivity, transmission activity, and/or reception activity at each transceiver of each of the IoT devices. The set of policy rules 120 includes specific rules that effectuate the device behavior detailed in the device behavior profile, such as setting specific network connectivity parameters at the transceiver of the IoT devices, enabling specific configuration settings at the IoT devices, performing specific operations at the IoT devices, and/or causing the IoT devices to enter specific operational modes.

The network device causes the device behavior profile, the set of policy rules, and a policy management application to be pushed out to each of the IoT devices. Upon receipt, each of the IoT devices executes the policy management application, which then uses the device behavior profile and the policy rules to manage and control the operation of the IoT device, including controlling the connectivity of the IoT device with the wireless network, and controlling the transmission activity from, and the reception activity at, the IoT device.

Figure 1A:
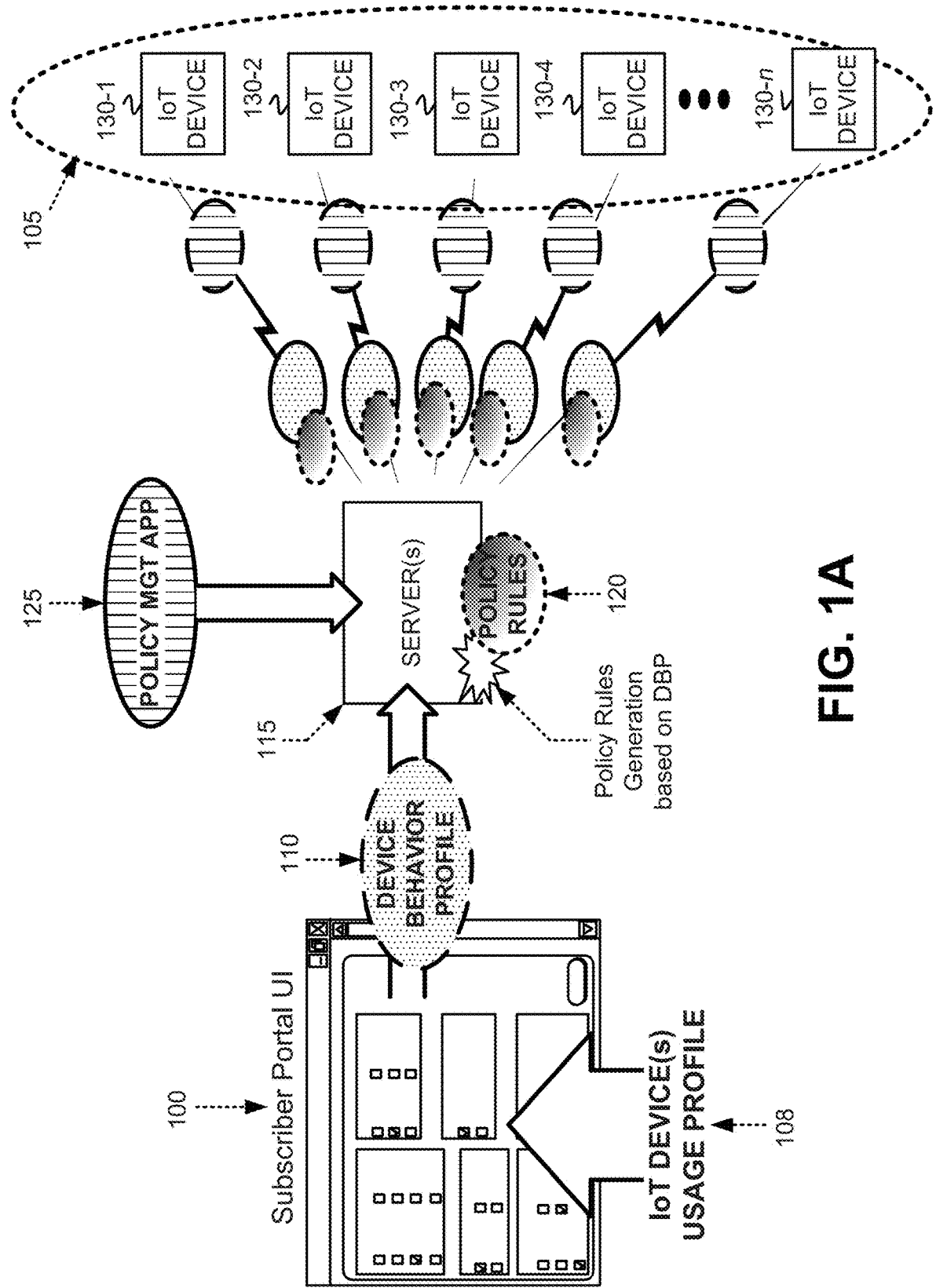
FIG. 1A is a diagram that depicts an overview of the creation of a device behavior profile based on a subscriber-provided usage profile that characterizes a wireless network usage pattern of at least one Internet of Things devices.

FIG. 1A is a diagram that depicts an overview of the creation of a device behavior profile based on a subscriber-provided usage profile that characterizes a wireless network usage pattern of at least one IoT devices. FIG. 1A further depicts generation of policy rules for the IoT devices based on the usage profile, and provision of the device behavior profile and the policy rules to the at least one IoT device. A subscriber (not shown in FIG. 1A), or network operator agent, may access a subscriber portal user interface (UI) 100 and may use the UI 100 to submit multiple parameters associated with a usage pattern or usage profile 108 of a group 105 of IoT devices. The usage profile 108 includes multiple subscriber-provided parameters that detail a network usage pattern of each IoT device 130 in the group 105 of IoT devices. The multiple parameters associated with the usage profile 108 may include, but are not limited to, parameters specifying a transmission or reception data quantity per transmission, one or more transmission or reception times or time periods, a data transmission/reception frequency (e.g., transmissions or receptions per day), a mobility characteristic (e.g., fixed device, roaming device, etc.), a device power characteristic (e.g., continuous external power, battery powered, etc.), network signal coverage requirements (e.g., expected signal loss that requires a certain transmission power, and/or a certain level of coverage enhancement, for adequate reception at the IoT device), or wireless network service requirements (e.g., voice service, data service, and/or Short Message Service (SMS) texting service). The group 105 of IoT devices includes at least one IoT device and, if the group of IoT devices includes multiple IoT devices, the multiple IoT devices may include similar IoT devices that perform a same or similar function, or that have a same or similar data usage pattern for transmitting or receiving data via the wireless network.

As shown in FIG. 1A, upon submission of the usage profile for the group 105 of IoT devices, a device behavior profile 110 may be generated by a server(s) 115, or by another network device(s) (not shown). The device behavior profile 110 includes specific device behavior parameters, to be implemented at IoT device 130, and/or at a component of the wireless network(s) that serves the IoT device 130, for effectuating the usage profile 108 provided via subscriber portal UI 100. The device behavior profile 110 may detail specific parameters associated with the IoT device 130's network access, network coverage, and/or network service requirements. Other parameters, not described, may be detailed within device behavior profile 110.

The server(s) 115, or other network device(s), may generate a set of policy rules 120 based on the device behavior profile 110. The set of policy rules 120 includes specific rules, including conditional rules and unconditional rules, for implementation by a policy management application 125 to effectuate the device behavior detailed in device behavior profile 110. The set of policy rules 120, for example, may cause policy management application 125 to set specific network connectivity parameters at transceiver(s) 150 of IoT device 130, to perform specific operations at IoT device 130, and/or to cause IoT device 130 to enter specific operational modes (e.g., sleep mode at transceiver(s) 150).

The server(s) 115, or other network device(s), may additionally obtain the policy management application 125. The policy management application 125 includes a software application (e.g., an applet) that, when executed by an IoT device 130, uses the set of policy rules 120 and the device behavior profile 110 as a basis for managing and controlling the operation of the transceiver of IoT device 130, including controlling the transceiver's connectivity with the wireless network (not shown). Server(s) 115 may, as shown in FIG. 1A, cause the policy management application 125, device behavior profile 110, and policy rules 120 to be sent to each IoT device 130 within the group 105 of IoT devices.

Figure 1B:
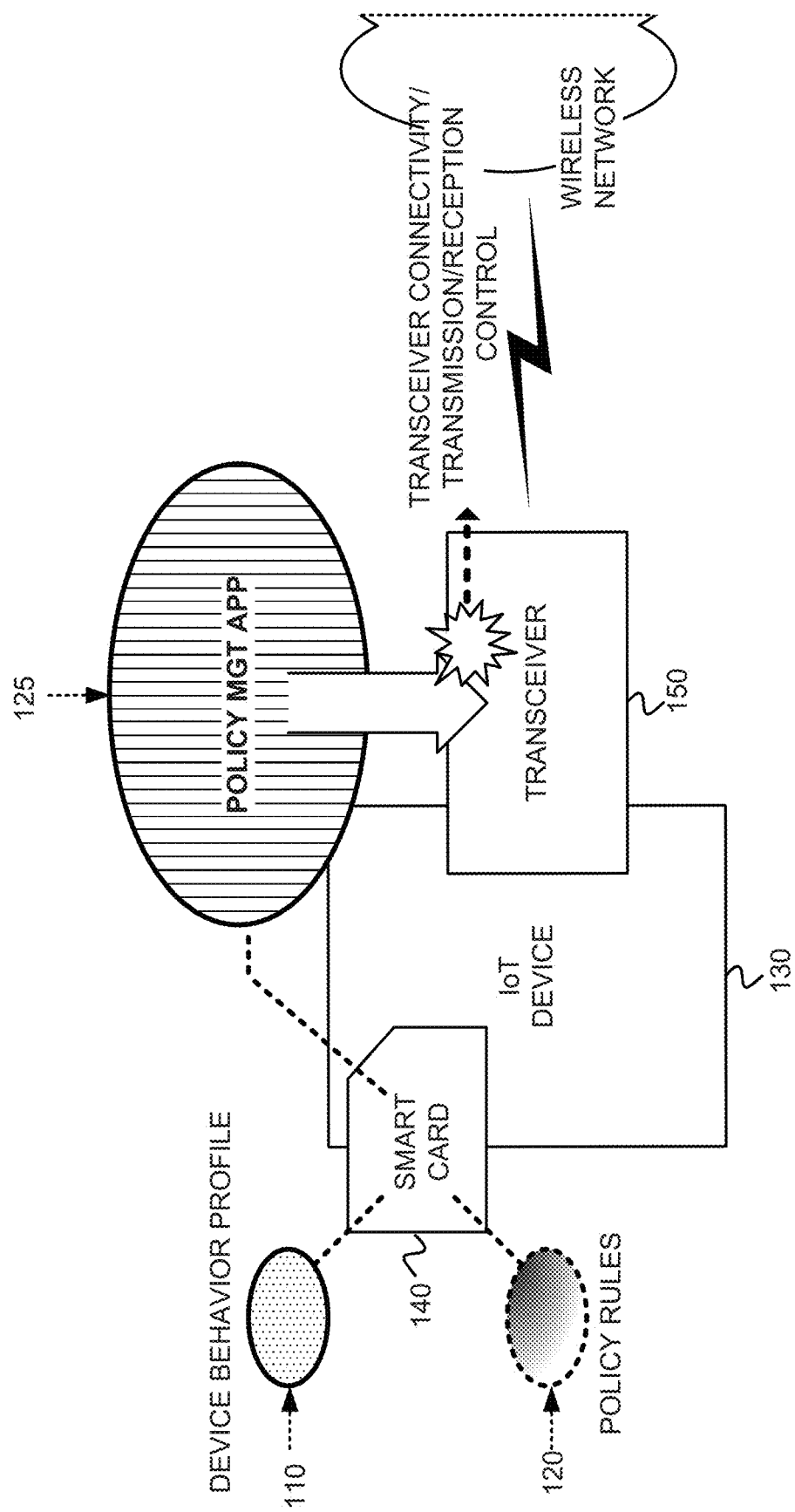
FIG. 1B further depicts use of a policy management application at an Internet of Things device for implementing device connectivity transmission control based on the created device behavior profile of FIG. 1A.

FIG. 1B further depicts use of the policy management application 125 at an IoT device 130 for implementing device connectivity transmission control based on the device behavior profile 110 and/or policy rules 120. As shown in FIG. 1B, upon receipt of the policy management application 125, device behavior profile 110, and policy rules 120 at IoT device 130, policy management application 125, device behavior profile 110, and policy rules 120 may be stored within a smart card 140 installed in IoT device 130. Smart card 140 may include a pocket-sized, or smaller, card with embedded integrated circuits. Smart card 140 may include a microprocessor smart card that contains memory storage components and microprocessor components. Smart card 140 may, in some implementations, have limited memory capacity and limited processing power relative to the memory and microprocessor contained in the IoT device 130 into which smart card 140 is inserted or installed.

Subscriber Identity Module (SIM), Universal Integrated Circuit Cards (UICCs), embedded UICCs (eUICCs), and Removable User Identity Module (R-UIM) cards are examples of smart card 140. SIM cards securely store an identifier or key used to identify a subscriber on IoT devices 130. SIM cards enable subscribers to change devices by removing the SIM card from one device and inserting it into another device. UICCs are smart cards used in mobile terminals in, for example, Global System for Mobile Communications (GSM), Universal Mobile Telecommunications System (UMTS), Fourth Generation (4G) Long Term Evolution (LTE) networks, and Fifth Generation (5G) networks. UICCs ensure the integrity and security of different types of personal data, and may include several applications that permit access to GSM, UMTS, and/or LTE networks. UICCs typically are pre-installed, during the manufacturing process, with Mobile Network Operator (MNO) profiles which include the applications (e.g., applets) and credentials (e.g., keys) necessary for the IoT devices 130, into which the UICCs are inserted, to attach to particular wireless MNO network(s). The MNO profiles, in typical UICCs, remain installed in the UICCs for the life cycle of the UICCs, and usually cannot be changed or deleted. eUICCs are UICCs that, unlike typical UICCs, are not easily accessible or replaceable within the IoT device 130. eUICCs are not intended to be removed or replaced within IoT device 130, and have the capability of enabling the secure changing of wireless network service subscriptions, such as changing the applications and credentials necessary for the IoT device 130 to attach to the MNO network(s). R-UIMs include cards having features that are usable with Code Division Multiple Access (CDMA), GSM and UMTS devices.

Policy management application 125, when executed by an internal microprocessor of IoT device 130, uses the device behavior profile 110 and set of policy rules 120 to exercise device connectivity transmission/reception control of a transceiver 150 of IoT device 130. Control of transceiver 150 by policy management application 125 may include controlling when wireless connectivity between transceiver 150 and the wireless network occurs, and controlling the timing, frequency, and data quantity, of each data transmission from, or data received at, transceiver 150 of IoT device 130. Connectivity transmission/reception control of transceiver 150 of IoT device 130 by policy management application 125 is described in further detail below.

Figure 2:
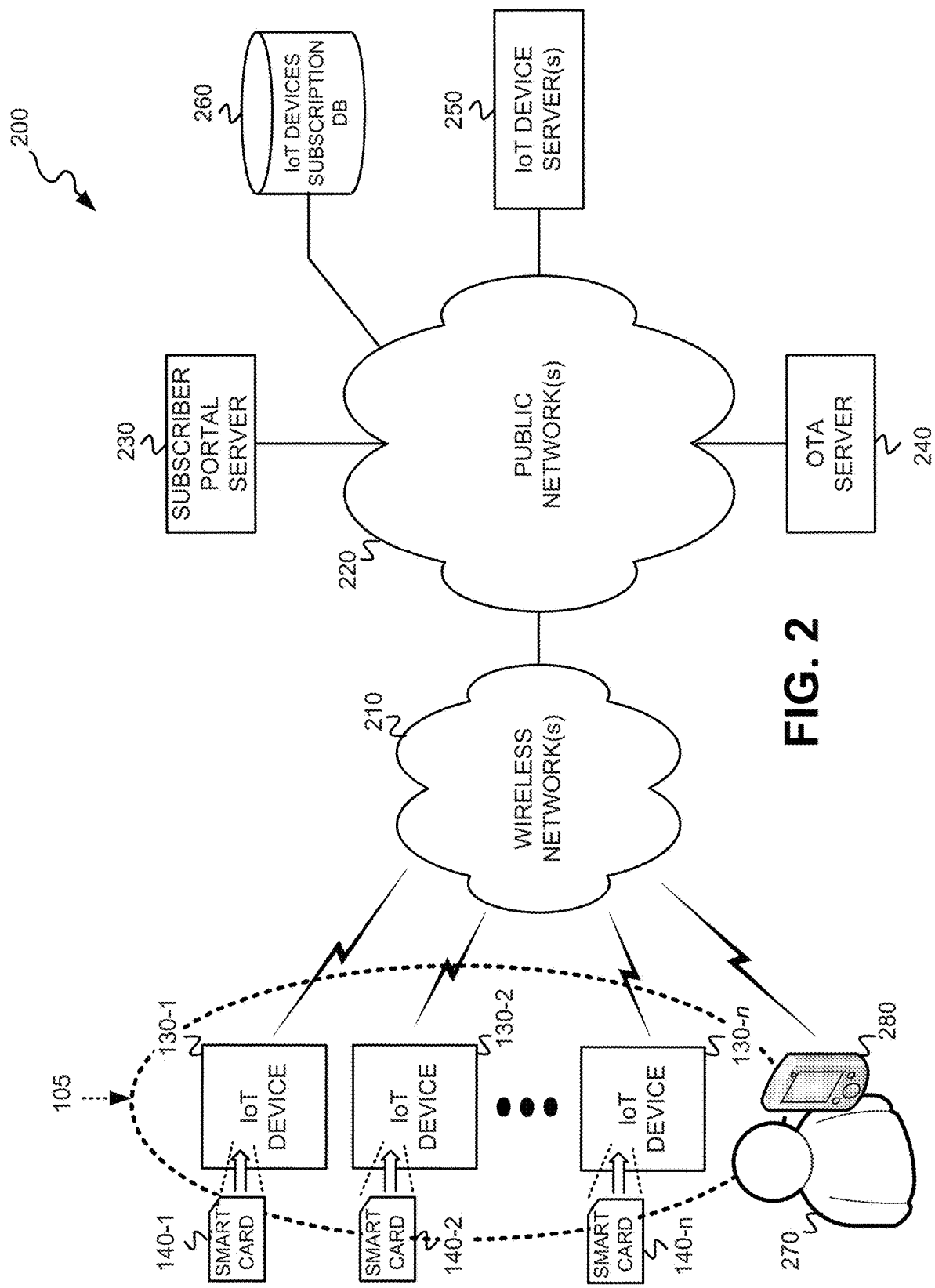
FIG. 2 is a diagram that depicts an exemplary network environment in which a subscriber provides the usage profile that is used to create the device behavior profile depicted in FIGS. 1A and 1B.

FIG. 2 is a diagram that depicts an exemplary network environment 200 in which a subscriber provides the usage profile that is used to create the device behavior profile and the set of policy rules depicted in FIGS. 1A and 1B. Network environment 200 includes the group 105 of IoT devices that further includes IoT devices 130-1 through 130-n, where n is a positive integer greater than or equal to one. Network environment 200 further includes a wireless network(s) 210, a public network(s) 220, a subscriber portal server 230, an Over-The-Air (OTA) server 240, an IoT device server(s) 250, and an IoT devices subscription DB 260. Subscriber portal server 230 and/or OTA server 240 may correspond to server(s) 115 of FIG. 1A.

IoT devices 130-1 through 130-n (generically referred to herein as "IoT device 130" or "IoT devices 130") may each have computational capability and one or more of various types of sensors. Each of IoT devices 130 may be alternatively called a "machine-to-machine" (M2M) device. Each of IoT devices 130 includes a wireless communication interface for communicating with wireless network(s) 210. Each of IoT devices 130 may include various types of sensors including, but not limited to, utility electrical power usage sensors, temperature sensors, humidity sensors, pedestrian sensors, smoke detectors, vehicle sensors, proximity sensors, motion detectors, cameras, video cameras, parking sensors, and open/close door sensors. Each of IoT devices 130-1 through 130-n further includes, as shown in FIG. 2, a respective smart card 140-1 through 140-n. Smart card 140 includes any type of microprocessor smart card capable of being interconnected with IoT device 130 (e.g., inserted into, or installed within, IoT device 130). Smart card 140 may include a SIM, a UICC, an eUICC, or a R-UIM card which stores a Mobile Network Operator (MNO) profile, a device behavior profile, policy rules, and policy management application 125, in addition to other applications and/or data. Other types of microprocessor smart cards, not described herein, may be used for each smart card 140.

As shown in FIG. 2, a subscriber 270 may be associated with the group 105 of IoT devices 130. Subscriber 270 may be an owner, operator, or administrator of the IoT devices 130 within group 105. In one example, subscriber 270 may include an employee of a company that is responsible for maintaining a wireless network service subscription for IoT devices 130 of group 105. Subscriber 270 may also own, operate and/or carry a device 280 that subscriber 270 may use to institute a subscription with wireless network(s) 210 for the group 105 of IoT devices. Device 280 may include any type of computational device that may communicate with wireless network(s) 210 and/or public network(s) 220 via a wired or wireless connection. Device 280 may include, for example, a desktop, laptop, or tablet computer, a personal digital assistant (PDA), or a "smart" phone.

Wireless network(s) 210 may include one or more wireless networks, such as, for example, one or more wireless public land mobile networks (PLMNs) or wireless satellite networks. The PLMN(s) may include a Code Division Multiple Access (CDMA) 2000 PLMN, a GSM PLMN, a Long Term Evolution (LTE) PLMN and/or other types of PLMNs not specifically described herein. Public network(s) 220 may include one or more networks of any type, such as, for example, a telecommunications network (e.g., a Public Switched Telephone Network (PSTN)), a local area network (LAN), a wide area network (WAN), a metropolitan area network (MAN), an intranet, the Internet, and/or one or more cable networks (e.g., optical cable networks).

Subscriber portal server 230 includes one or more network devices that present a user interface to subscriber 270, via device 280, to enable subscriber 270 to provide an IoT devices usage profile for a group 105 of IoT devices 130. Subscriber portal server 230 further receives parameters associated with the IoT devices usage profile from subscriber 270, and generates a device behavior profile based on the usage profile parameters. Subscriber portal server 230 may also generate a set of policy rules based on the generated device behavior profile, and may upload the device behavior profile and the set of policy rules to IoT devices subscription DB 260.

OTA server 240 includes one or more network devices that retrieve a device behavior profile, and a set of policy rules, from IoT devices subscription DB 260 for a particular group 105 of IoT devices 130. OTA server 240 further sends the retrieved device behavior profile and policy rules to each IoT device 130 of the group 105 of IoT devices. OTA server 240 may send the device behavior profile and policy rules to each IoT device 130 of the group 105 of IoT devices in a "push" or "pull" fashion.

IoT device server(s) 250 includes at least one network device that receives data transmissions from one or more IoT devices 130. The data transmissions may include, for example, the transmission of sensor data generated at each IoT device 130. IoT devices subscription DB 260 includes one or more network devices that stores a data structure (e.g., a tabular data structure) that further stores a usage profile, a generated device behavior profile, and generated policy rules for each group 105 of IoT devices 130. The data structure may further store general information for each group 105 of IoT devices 130 including, for example, a unique identifier of the subscriber associated with the group 105, a unique identifier of the group 105, an identifier of a type of IoT device of each IoT device 130 in the group 105, and unique identifiers associated with each IoT device 130 in the group 105.

The configuration of the components of network environment 200 depicted in FIG. 2 is for illustrative purposes only. It should be understood that other configurations may be implemented. Therefore, network environment 200 may include additional, fewer and/or different components, that may be configured differently, than depicted in FIG. 2. For example, though a single group 105 of IoT devices 130 is shown in FIG. 2, network environment 200 may include multiple different groups 105 of IoT devices 130. The multiple different groups 105 may be associated with a single subscriber 270, or each of the multiple different groups 105 may be associated with a different subscriber 270 of multiple subscribers.

Figure 3:
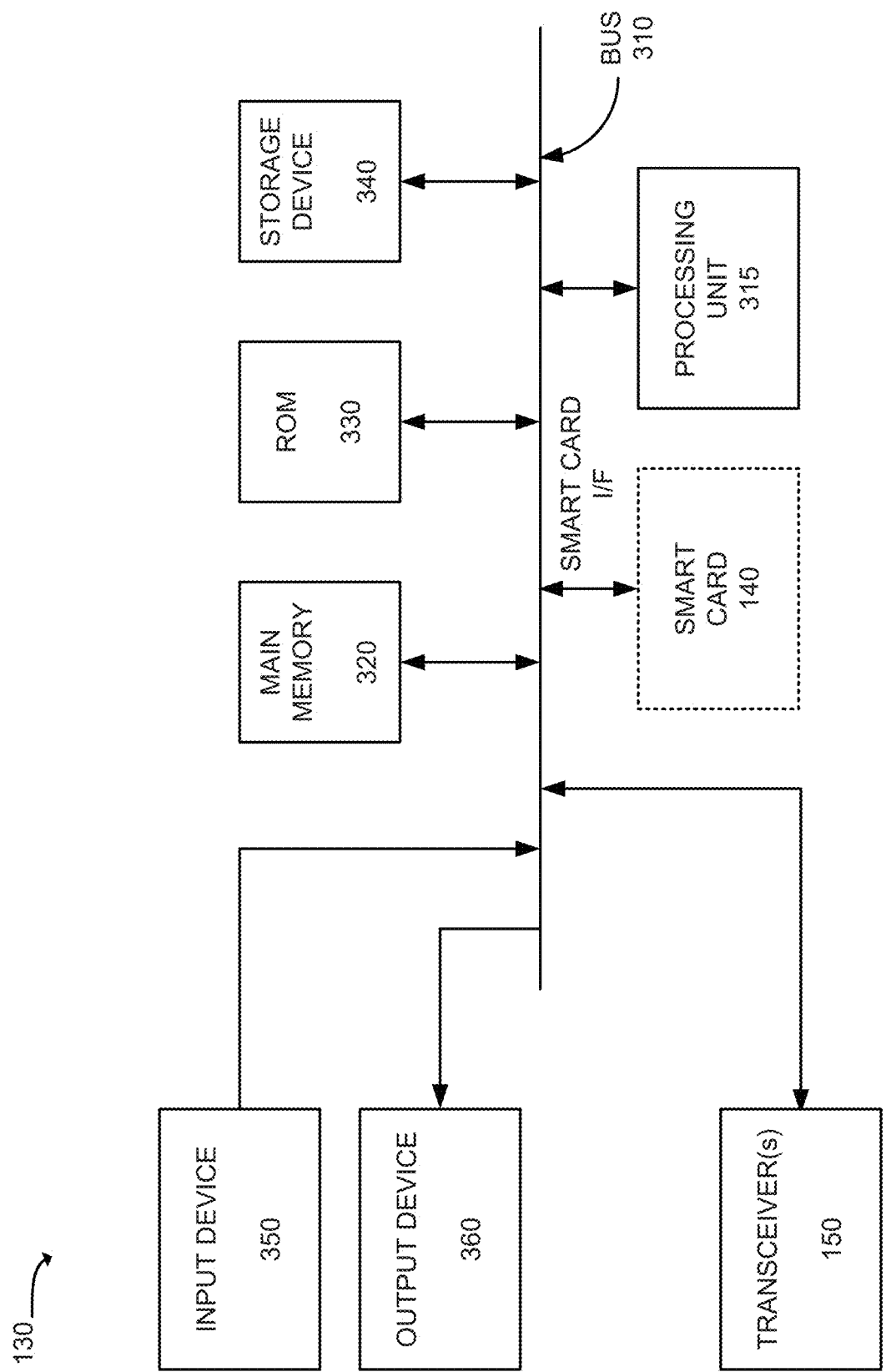
FIG. 3 is a diagram of exemplary components of an Internet of Things device of FIG. 2.

FIG. 3 is a diagram of exemplary components of an IoT device 130. Each network device of subscriber portal server 230, OTA server 240, IoT device server(s) 250, and IoT devices subscription DB 260 may include the same, or similar, components, in a same or similar configuration, to that of IoT device 130 depicted in FIG. 3. IoT device 130 may include a bus 310, a processing unit 315, a smart card 140, a main memory 320, a read only memory (ROM) 330, a storage device 340, an input device 350, an output device 360, and transceiver(s) 150. Bus 310 may include a path that permits communication among the elements of IoT device 130. As further shown in FIG. 3, smart card 140 may be interconnected with a smart card interface (I/F) of IoT device 130 that further connects to bus 310.

Processing unit 315 may include a processor, microprocessor, or processing logic that may interpret and execute instructions. Main memory 320 may include a random access memory (RAM) or another type of dynamic storage device that may store information and instructions for execution by processing unit 315. ROM 330 may include a Read Only Memory (ROM) device or another type of static storage device (e.g., Electrically Erasable Programmable ROM (EEPROM)) that may store static information and instructions for use by processing unit 315. Storage device 340 may include a magnetic and/or optical recording medium and its corresponding drive. Main memory 320, ROM 330 and storage device 340 may each be referred to herein as a "non-transitory computer-readable storage medium" or a "non-transitory storage medium."

Input device 350 may include one or more devices that permit a user or operator to input information to device 130, such as, for example, a keypad or a keyboard, a display with a touch sensitive panel, voice recognition and/or biometric mechanisms, etc. Output device 360 may include one or more devices that output information to the operator or user, including a display, a speaker, etc. Input device 350 and output device 360 may, in some implementations, be implemented as a graphical user interface (GUI) that displays GUI information and which receives user input via the GUI. In some implementations, input device 350 and output device 360 may be omitted from IoT devices 130. Transceiver(s) 150 may include one or more transceivers that enable IoT device 130 to communicate with other devices and/or systems. For example, transceiver(s) 150 may include a wireless transceiver (including one or more antennas) for communicating via wireless network(s) 210. In some implementations, transceiver(s) 150 may include a Global Positioning System (GPS) device that can determine the geographic location of device 130. In the case of subscriber portal server 230, OTA server 240, IoT device server(s) 250, or IoT devices subscription DB 260, then transceiver(s) 150 may include a wired transceiver for communicating via public network(s) 220.

IoT device 130 may perform certain operations or processes, as may be described below. IoT device 130 may perform these operations in response to processing unit 315 executing software instructions contained in a computer-readable medium, such as memory 320. A computer-readable medium may be defined as a physical or logical memory device. A logical memory device may include memory space within a single physical memory device or spread across multiple physical memory devices. The software instructions may be read into main memory 320 from another computer-readable medium, such as storage device 340, or from another device via transceiver(s) 150. The software instructions contained in main memory 320 may cause processing unit 315 to perform the operations or processes. Alternatively, hardwired circuitry may be used in place of, or in combination with, software instructions to implement the operations or processes. Thus, exemplary implementations are not limited to any specific combination of hardware circuitry and software.

The configuration of components of IoT device 130 illustrated in FIG. 3 is for illustrative purposes only. It should be understood that other configurations may be implemented. Therefore, IoT device 130 may include additional, fewer and/or different components, arranged in a different configuration, than depicted in FIG. 3.

Figure 4:
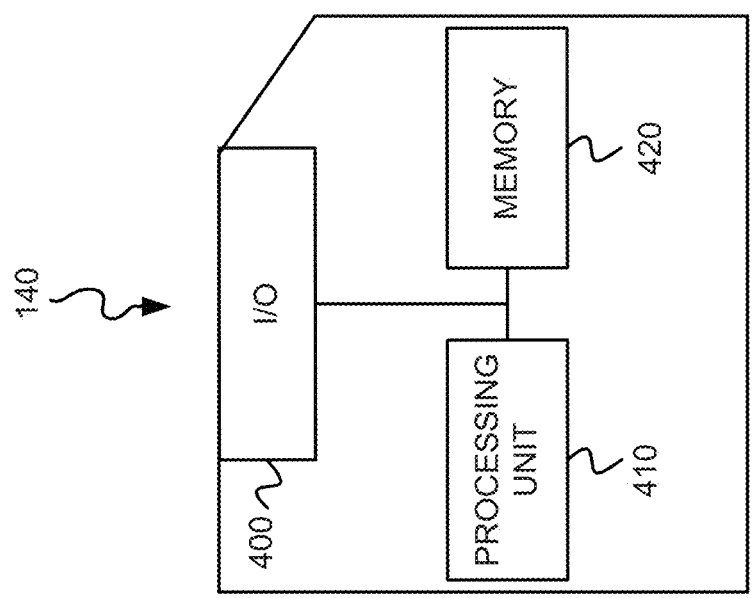
FIG. 4 is a diagram that depicts exemplary components of a smart card of an Internet of Things device of FIG. 2.

FIG. 4 is a diagram that depicts exemplary components of smart card 140. Smart card 140 may include input/output circuitry 400, a processing unit 410, and a memory 420. Input/output circuitry 400 may include circuitry for inputting data to smart card 140 from IoT device 130 (e.g., via bus 310), and output circuitry for outputting data from smart card 140 to IoT device 130 (e.g., via bus 310). Processing unit 410 may include a processor, microprocessor, or processing logic that may execute instructions. Memory 420 may include RAM, ROM, and/or Electrically Erasable Programmable Read-Only Memory (EEPROM) that may store data, and may store instructions for execution by processing unit 410. Memory 420 may be referred to herein as a "non-transitory computer-readable storage medium" or a "non-transitory storage medium."

Smart card 140 may perform certain operations or processes as may be described below. Smart card 140 may perform these operations in response to processing unit 410 executing software instructions contained in the non-transitory computer-readable storage medium of memory 420. For example, memory 420 may store policy management application 125, device behavior profile 110, and policy rules 120. Processing unit 410 of smart card 140 may execute policy management application 125 to control the connectivity and transmission behavior of transceiver 150 of IoT device 130 based on device behavior profile 110 and policy rules 120.

The configuration of components of smart card 140 illustrated in FIG. 4 is for illustrative purposes only. It should be understood that other configurations may be implemented. Therefore, smart card 140 may include additional, fewer and/or different components, arranged in a different configuration, than depicted in FIG. 4.

Figure 5:
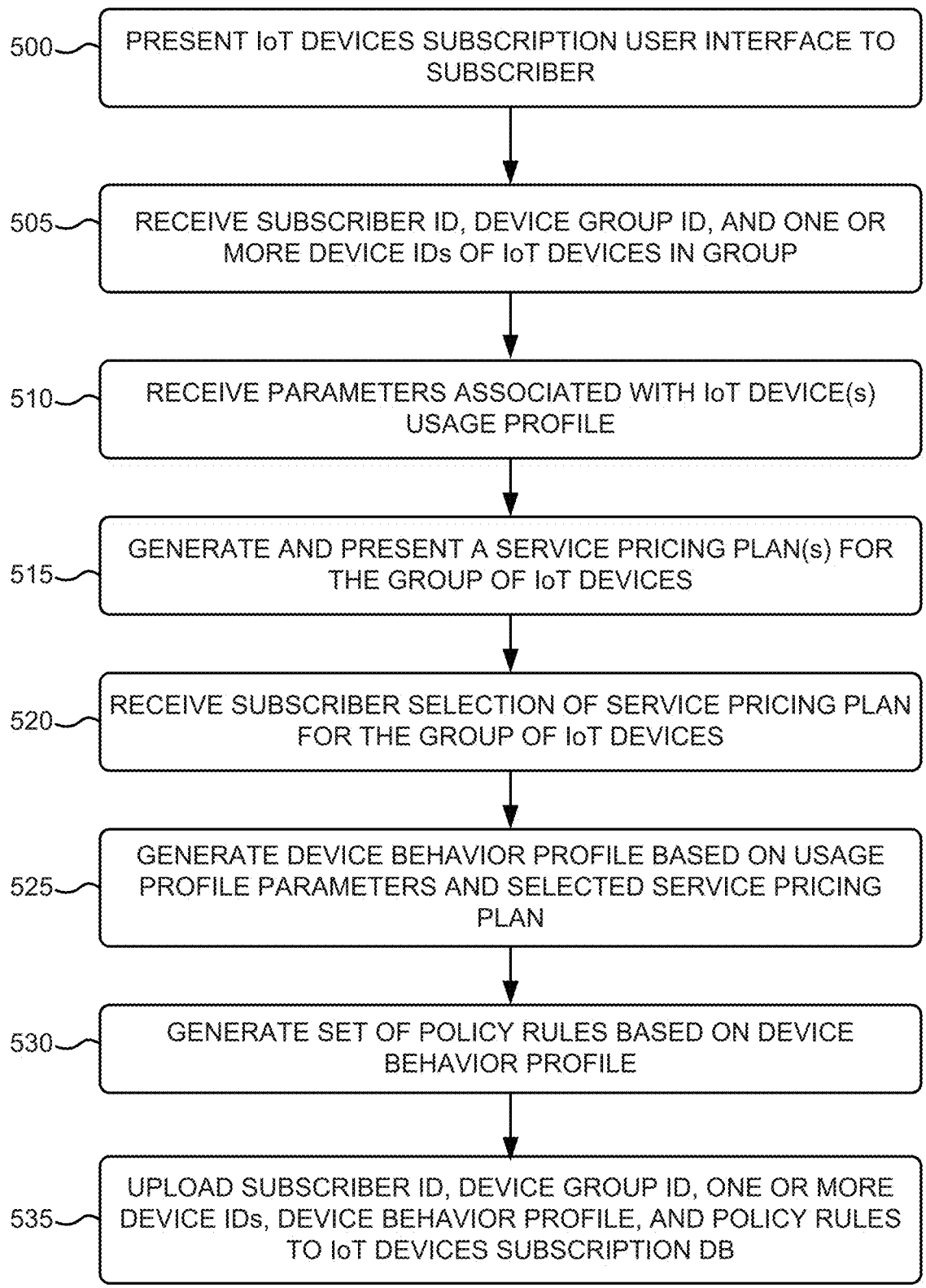
FIG. 5 is a flow diagram that illustrates an exemplary process for receiving parameters associated with a usage profile of one or more Internet of Things devices, and generating a device behavior profile and a set of policy rules based on the parameters of the usage profile.

FIG. 5 is a flow diagram that illustrates an exemplary process for receiving parameters associated with a usage profile of one or more IoT device(s), and generating a device behavior profile and a set of policy rules based on the parameters of the usage profile. The exemplary process of FIG. 5 may be implemented by a processing unit of subscriber portal server 230. The exemplary process of FIG. 5 is described with reference to the diagrams of FIGS. 6A, 6B, and 7.

Figure 6A:
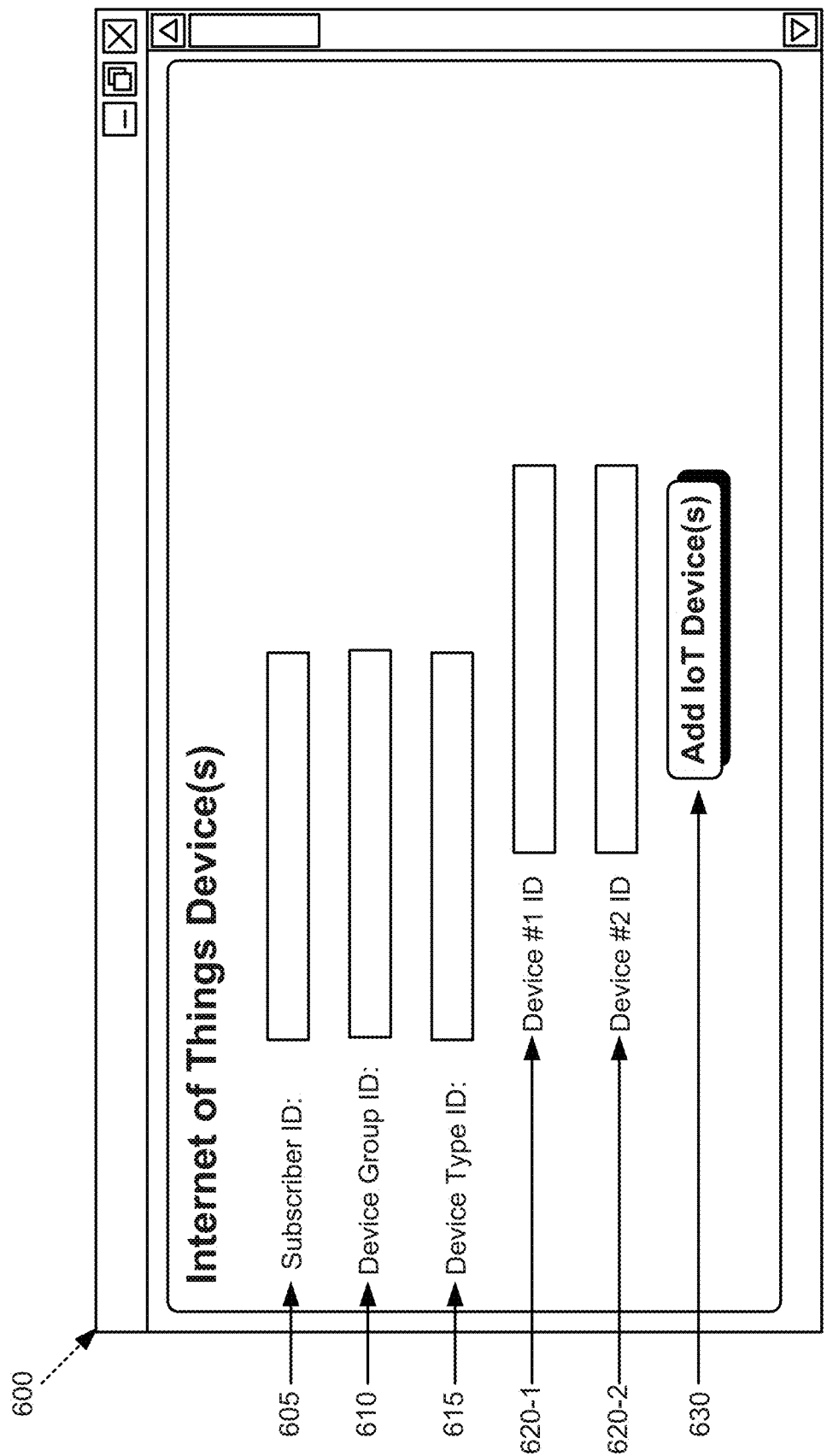

The exemplary process includes subscriber portal server 230 presenting an IoT devices subscription user interface (UI) to subscriber 270 (block 500). FIGS. 6A and 6B depict an example of a user interface 600 that subscriber portal server 230 may provide to subscriber 270 via device 280. The user interface 600 of FIGS. 6A and 6B permits the subscriber 270 to provide information for subscribing a group 105 of IoT devices 130 to a wireless network service. The messaging diagram of FIG. 7 further depicts subscriber portal server 230 sending IoT devices user interface (UI) 600 to subscriber 270 via device 280.

Figure 7:
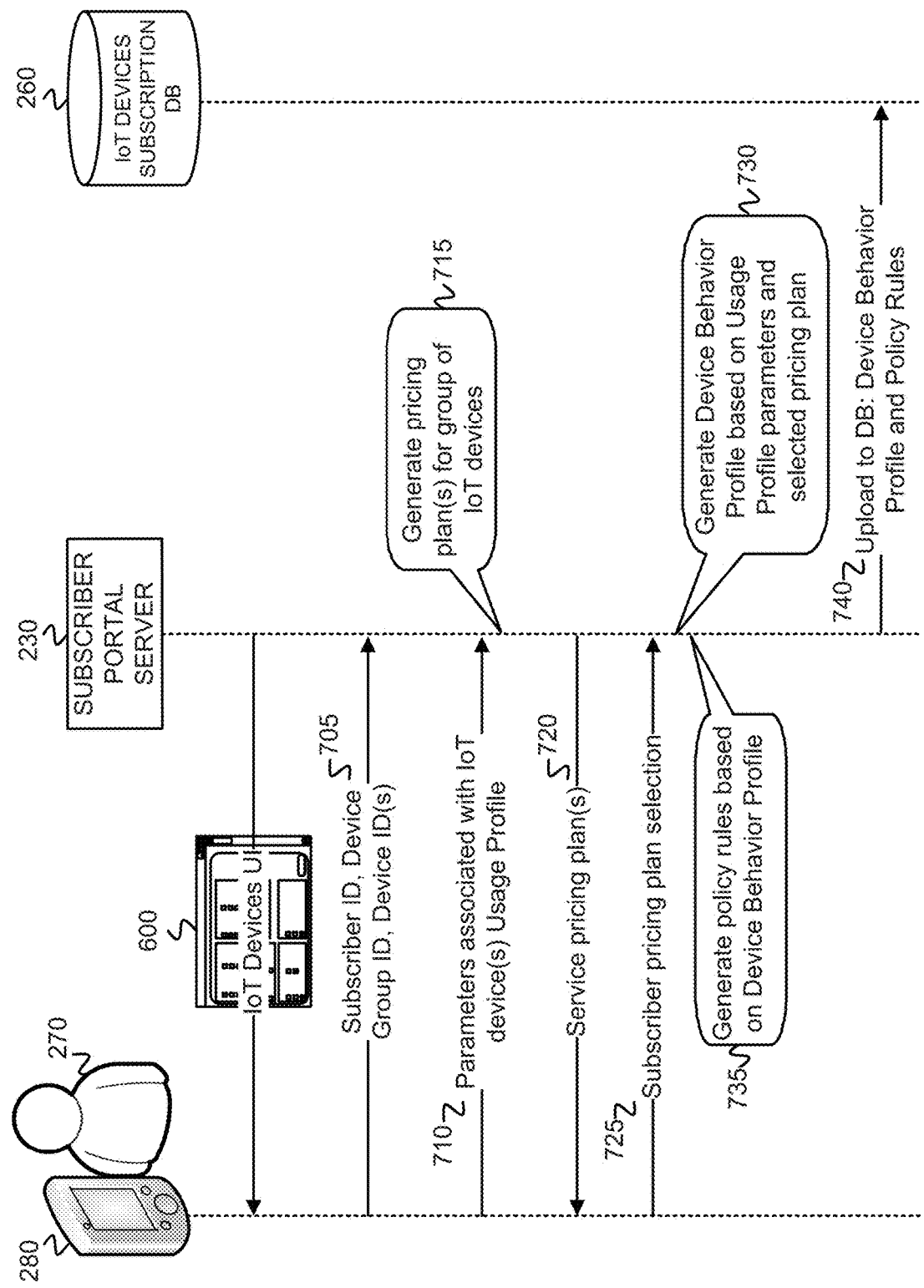
FIG. 7 is an exemplary messaging and operation diagram associated with the process of FIG. 5.

Subscriber portal server 230 receives a subscriber identifier (ID), a device group ID, and one or more device IDs of IoT devices in the group 105 (block 505). Subscriber portal server 230 may additionally receive a device type ID for the IoT devices in the group 105, where the device type ID identifies a particular type or class of IoT device for the IoT devices 130 in the group 105. As shown in FIG. 6A, the information associated with the group 105 of IoT devices may be entered in user interface 600 provided by subscriber portal server 230 to subscriber 270. User interface 600 may include a subscriber ID field 605, a device group ID field 610, a device type ID field 615, and device ID fields 620-1 and 620-2. Subscriber ID field 605 permits subscriber 270 to enter a globally unique identifier for subscriber 270, or for an organization or entity that owns, operates, and/or administers the group 105 of IoT devices that subscriber 270 is entering into user interface 600. Device group ID field 610 permits subscriber 270 to enter a globally unique identifier for the group 105 of IoT devices 130 that subscriber 270 is entering into user interface 600. Device type ID field 615 permits subscriber 270 to enter a identifier associated with a type, or class, of IoT devices of the group 105 of IoT devices 130 being entered into user interface 600. Device ID fields 620-1 and 620-2 (and 620-3 through 620-x, not shown) permits subscriber 270 to enter a globally unique identifier (e.g., a network address, an International Mobile Equipment Identity (IMEI), etc.) for each IoT device 130 contained in the group 105 of IoT devices being entered into user interface 600. If more IoT devices are contained in the group 105 of IoT devices than the number of fields 620 currently displayed in user interface 600, then subscriber 270 may select "Add IoT device(s)" button 630 one or more times to add a corresponding one or more additional device ID fields 620 to the display of user interface 600. Subscriber 270 may enter a globally unique ID (e.g., a network address) for each additional device ID field 620 added to user interface 600. FIG. 7 depicts information 705 provided by subscriber 270 via IoT devices UI 600, including the subscriber ID, device group ID, and device ID(s), being sent from device 280 to subscriber portal server 230.

Subscriber portal server 230 receives parameters associated with an IoT device(s) usage profile (block 510). The usage profile includes multiple parameters that detail a network usage pattern of each IoT device 130 in the group 105 of IoT devices. Specific examples of IoT device usage profiles are described further below with respect to FIGS. 13 and 14. As further shown in FIG. 6B, the parameters associated with the usage profile of the one or more IoT devices 130 within the group 105 of IoT devices may be entered in user interface 600 provided by subscriber portal server 230 to subscriber 270. User interface 600 may include a "data quantity per transmission" section 640, a "mobility of device(s)" section 645, a "time of transmission(s)" section 650, a "frequency of data transmission" section 655, a "services" section 660, a "signal coverage requirement" section 665, and/or a "device power considerations" section 670.

"Data quantity per transmission" section 640 includes multiple checkboxes associated with multiple different data quantities that the IoT device 130 may typically send at each transmission, or receive from wireless network(s) 210. In the example depicted in FIG. 6B, section 640 includes checkboxes associated with less than 0.1 kilobyte (kB), 0.1 kB-0.5 kB, 0.6 kB-1.0 kB, 1.1 kB-1.5 kB, 1.6 kB-2.0, 2.1 kB-5 kB, 5.1 kB-10 kB, or greater than 10 kB of transmitted or received data. Other ranges of data quantities, however, may be used in the user interface 600 of FIG. 6B. Subscriber 270 may select one of the checkboxes in section 640 that corresponds to the typical quantity of data transmitted from, or received at, each IoT device 130 of the group 105 of IoT devices.

"Mobility of device(s)" section 645 includes multiple checkboxes associated with multiple different types of mobility that are associated with the IoT devices 130 of the group 105 of IoT devices. In the example depicted in FIG. 6B, section 645 includes checkboxes associated with a fixed mobility, a mostly fixed mobility, a mobile mobility, or a mostly mobile mobility. Subscriber 270 may select the checkbox associated with "fixed mobility" if the IoT devices 130 of the group 105 of IoT devices 130 are located at a fixed position relative to the serving components of wireless network(s) 210. Subscriber 270 may select the checkbox associated with "mostly fixed" mobility if the IoT devices 130 of the group 105 of IoT devices 130 are located at a fixed position relative to the serving components of wireless network(s) 210 most of the time, with only occasional periods of movement relative to the serving components of wireless network(s) 210. Subscriber 270 may select the checkbox associated with "mobile" mobility if the IoT devices 130 of the group 105 of IoT devices 130 are in a nearly constant state of movement relative to the serving components of wireless network(s) 210. Subscriber 270 may select the checkbox associated with "mostly mobile" mobility if the IoT devices 130 of the group 105 of IoT devices 130 are in a state of movement relative to the serving components of wireless network(s) 210 most of the time, but have significant periods where the IoT devices 130 maintain a fixed position.

"Time of transmission(s)" section 650 includes multiple checkboxes associated with multiple different time periods during which the IoT devices 130 of the group 105 of IoT devices may typically transmit or receive data via wireless network(s) 210. In the example depicted in FIG. 6B, section 650 includes checkboxes associated with the time periods of 1 am-12 pm, 12 pm-5 pm, 5 pm-10 pm, 10 pm-3 am, and 3 am-7 am. Subscriber 270 may select one or more of the checkboxes associated with the time periods during which each IoT device 130 transmits data to, or receives data from, wireless network(s) 210. For example, an IoT device 130 that transmits data in the morning and the evening may have the checkboxes associated with "1 am-12 pm" and "5 pm-10 pm" selected by subscriber 270. Alternatively, section 650 may include multiple checkboxes (or fields) associated with multiple different times (e.g., in hours/minutes hh:mm) at which data is to be transmitted from, or received at, IoT device 130.

"Frequency of data transmission" section 655 includes multiple checkboxes associated with how frequently the IoT devices 130 of the group 105 of IoT devices transmit data to, or receive data from, wireless network(s) 210. In the example depicted in FIG. 6B, section 655 includes checkboxes associated with the frequencies of 1-4/month, 5-15/month, 1/day, 2-4/day, 5-15/day, or >15/day. Different ranges of frequencies of data transmission, not shown, may be presented in section 655 of user interface 600. Subscriber 270 may select one of the multiple checkboxes to designate how frequently the IoT device(s) 130 of the group 105 of the IoT devices transmits data to, or receives data from, wireless network(s) 210.

"Services" section 660 includes multiple checkboxes associated with different services, offered by the network provider of wireless network(s) 210, that the IoT device(s) 130 of the group 105 of IoT devices uses during its operation. In the example depicted in FIG. 6B, section 660 includes checkboxes associated with voice service, data service (e.g., GPS data, web browsing, etc.), or Short Message Service (SMS) texting service. Other types of wireless network services, not shown in the UI 600 of FIG. 6B, may additionally be used by the IoT device(s) 130 of the group 105 of IoT devices. Subscriber 270 may select one or more of the multiple checkboxes to designate which network services are to be part of the subscription for the wireless network service for the IoT device(s) 130 of the group 105 of IoT devices.

"Signal coverage requirement" section 665 includes multiple checkboxes associated with different signal coverage requirements that may be needed by the IoT device(s) 130 of the group 105 of IoT devices. In the example depicted in FIG. 6B, section 665 includes checkboxes associated with "normal coverage," "5 dB coverage extension," "10 dB coverage extension," "15 dB coverage extension," and "20 dB coverage extension" signal coverage. Other types of signal coverage requirements, not shown in the UI 600 of FIG. 6B, may additionally be included within section 665 for selection by subscriber 270. Subscriber 270 may select one of the multiple checkboxes to designate which particular signal coverage is required by the IoT device(s) 130 of the group 105 of IoT devices. For example, an IoT device(s) 130 located below ground may require a higher coverage enhancement level (e.g., a 10 db coverage extension) for transmitting data to, and receiving data from, wireless network(s) 210.

"Device power considerations" section 670 includes multiple checkboxes associated with different power considerations that are applicable to the IoT device(s) 130 of the group 105 of IoT devices. In the example depicted in FIG. 6B, section 670 includes checkboxes associated with "limited battery," "battery," and "continuous external power." Other types of device power considerations, not shown in the UI 600 of FIG. 6B, may additionally be included within section 670 for selection by subscriber 270. Subscriber 270 may select one of the multiple checkboxes to designate power considerations that are applicable to the IoT device(s) 130 of the group 105 of IoT devices. For example, if IoT device(s) 130 has a battery with a limited charge life, then subscriber 270 may select "limited battery" within section 670. As another example, if IoT device(s) 130 has a battery with a long charge life, subscriber 270 may select "battery" within section 670. As a further example, if IoT device(s) 130 is connected to a continuous, external power source, then subscriber 270 may select "continuous external power" from section 670. Upon completion of the selection of the various parameters, by subscriber 270, from sections 640-670 of UI 600, subscriber 270 may select a "submit" button, shown in FIG. 6B, for sending the various parameters associated with the usage profile to subscriber portal server 230. FIG. 7 depicts parameters 710, associated with the IoT device(s) usage profile, being sent from device 280 to subscriber portal server 230.

Subscriber portal server 230 generates and presents a service pricing plan(s) for the group of IoT devices (block 515), and receives subscriber selection of a service pricing plan for the group of IoT devices (block 520). Subscriber portal server 230 may take into account all of the various parameters associated with the IoT device(s) usage profile to generate one or more wireless network service pricing plans for the IoT devices 130 within the group 105 of IoT devices. Subscriber portal server 230 may evaluate the network cost associated with supporting the network service(s) required by the parameters of the usage profile provided in block 510 to generate one or more network service pricing plans. The network service pricing plan(s) may include pricing based on, among other factors, the "data quantity per transmission" selected in section 640, the "mobility of device(s)" selected in section 645, the "time of transmission(s)" selected in section 650, the "frequency of data transmission" selected in section 655, the "services" selected in section 660, the "signal coverage requirement" selected in section 665, and/or the "device power considerations" selected in section 670. For example, an IoT device(s) 130 having a larger quantity of data per transmission, that transmits more often during a given day, and that transmits during peak network usage periods, may cause the generation of a network service pricing plan that is more expensive to subscriber 270 than an IoT device(s) 130 having a smaller quantity of data per transmission, that transmits less often during the given day, and that transmits mostly during off-peak network usage periods. FIG. 7 depicts subscriber portal server 230 generating 715 a pricing plan(s) for the group 105 of IoT devices, sending the generated service pricing plan(s) 720 to subscriber 270 via device 280, and receiving a subscriber pricing plan selection 725 from subscriber 270 via device 280.

Subscriber portal server 230 generates a device behavior profile based on the usage profile parameters and the selected service pricing plan (block 525). The generated device behavior profile 110 may detail specific parameters associated with the IoT device 130's network access, network coverage, and/or network service requirements. For example, subscriber portal server 230, based on the usage profile for the IoT device(s) provided in block 510, may perform a network coverage evaluation to determine whether the IoT device(s) 130 require a CE mode A, CE mode B, or NB-IoT configuration. Subscriber portal server 230 may additionally determine a minimum feature set that is required for servicing the usage profile, such as whether to enable/disable certain features on the device (e.g., Cat-M1, Cat-NB1, Cat-M unicast frequency hopping). Other parameters, than those described, may also be detailed within device behavior profile 110. For example, APN configuration, non-IP PDN or IP PDN, attach w/o PDN (yes/no), CP or UP data transfer, PSM (yes/no) with active timer (T3324) or extended TAU timer (T3412) configuration, idle mode eDRX (yes/no) configuration and eDRX cycle configuration, and/or CDRX parameters and dormancy timer may be specified within device behavior profile 110 based on the device usage profile. Specific examples of device behavior profiles, generated from the usage profile parameters of block 510, are described further below with respect to FIGS. 13 and 14. The messaging diagram of FIG. 7 depicts subscriber portal server 230 generating 730 a device behavior profile based on the usage profile parameters and the selected pricing plan.

Subscriber portal server 230 generates a set of policy rules based on the generated device behavior profile (block 530). The set of policy rules includes specific rules, including conditional rules and unconditional rules, for implementation by policy management application 125 to effectuate the device behavior detailed in the device behavior profile of block 525. The set of policy rules enforce the data usage of the device behavior profile, ensuring that the IoT device(s) 130 is making efficient use of wireless network(s) 210, while complying with the service pricing plan selected in block 529. The set of policy rules, for example, may cause policy management application 125 to: 1) set specific network connectivity parameters at transceiver(s) 150 of IoT device 130, 2) perform specific operations at IoT device 130, and/or 3) cause IoT device 130 to enter specific operational modes (e.g., sleep mode at transceiver(s) 150). Specific examples of sets of policy rules, generated from the device behavior profiles of block 525, are described further below with respect to FIGS. 13 and 14. The messaging diagram of FIG. 7 depicts subscriber portal server 230 generating 735 a set of policy rules based on the device behavior profile.

Subscriber portal server 230 uploads the subscriber ID, the device group ID, the one or more device IDs, the device behavior profile, and the policy rules to IoT devices subscription DB 260 (block 535). Subscriber portal server 230 may upload the subscriber ID, the device group ID, the one or more device IDs, the device behavior profile, and the policy rules to a particular entry, or node, within the data structure stored within IoT devices subscription DB 260 such that the uploaded data may be subsequently retrieved. FIG. 7 depicts subscriber portal server 230 uploading 740 the device behavior profile and policy rules (and the subscriber ID, the device group ID, and the one or more device IDs) to IoT devices subscription DB 260.

The exemplary process of FIG. 5 may be repeated each time a subscriber creates a usage profile for a group 105 of IoT devices. Blocks of the process of FIG. 5 may be selectively repeated to revise or update a previously provided usage profile for a group 105 of IoT devices 130. When revising/updating a previously provided usage profile, subscriber 270 may provide the device group ID for the group 105 of IoT devices 130, and then blocks 510-535 may be performed, with block 535 uploading and storing the revised data for the group 105 in the same entry or node of IoT devices subscription DB 260.

Figure 8:
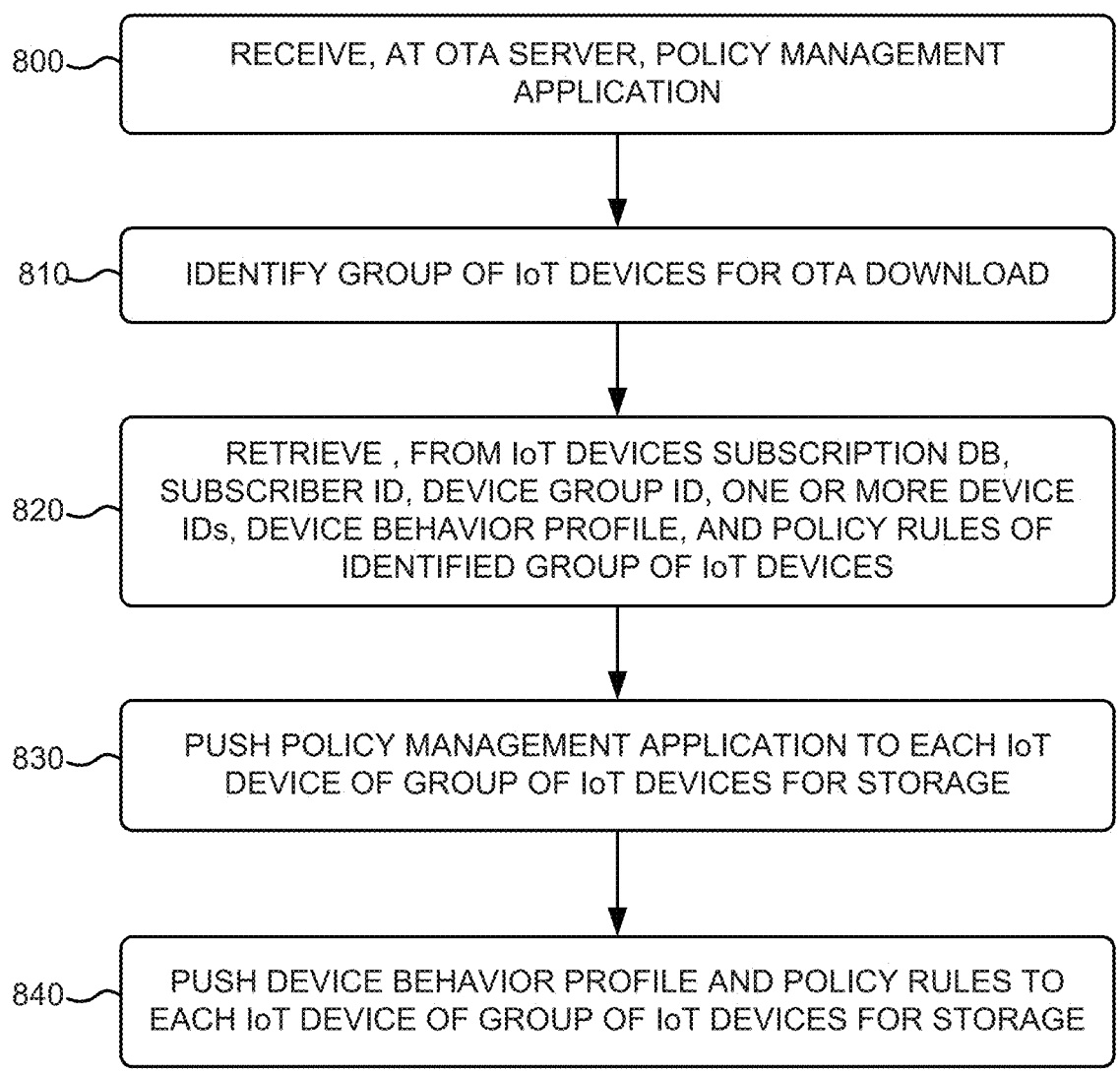
FIG. 8 is a flow diagram illustrating an exemplary process for pushing a policy management application, a device behavior profile, and a set of policy rules to each Internet of Things device within a group of Internet of Things devices.

FIG. 8 is a flow diagram illustrating an exemplary process for pushing a policy management application 125, a device behavior profile 110, and a set of policy rules 120 to each IoT device 130 within a group 105 of IoT devices. In one implementation, the exemplary process of FIG. 8 may be implemented by OTA server 240. The exemplary process of FIG. 8 is described with reference to the exemplary messaging diagram of FIG. 9. The exemplary process of FIG. 8 may occur subsequent to subscriber 270 provision of the usage profile of the IoT devices 130 within group 105, as described with respect to FIG. 5 above.

Figure 9:
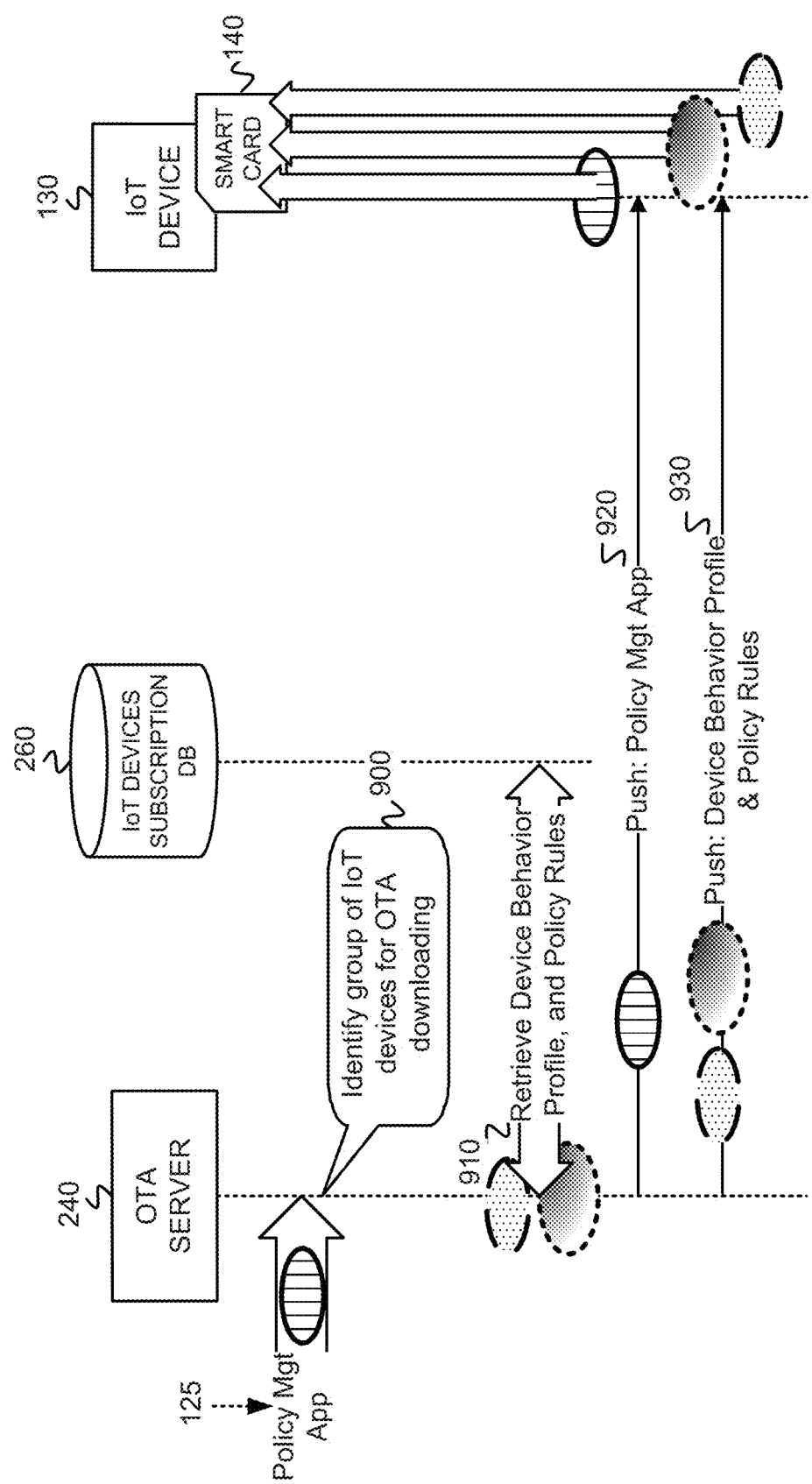
FIG. 9 is an exemplary messaging and operation diagram associated with the process of FIG. 8.

The exemplary process includes OTA server 240 receiving a policy management application 125 (block 800). OTA server 240 may receive the policy management application 125 from subscriber portal server 230, from an IoT device server 250, or from another server or network node not depicted in the network environment 200 of FIG. 2. The exemplary messaging diagram of FIG. 9 depicts OTA server 240 obtaining policy management application 125.

OTA server 240 identifies a group 105 of IoT devices for an OTA download (block 810). OTA server 240 may maintain a log of groups 105 of IoT devices to which OTA server 240 has previously performed an OTA download. OTA server 240 may compare the log with groups 105 of IoT devices having entries, or DB nodes, within IoT devices subscription DB 260 to determine which group(s) 105 of IoT devices for which an OTA download still needs to be performed. OTA server 240 may generate a schedule for performing OTA downloads to the determined group(s) 105 of IoT devices for which an OTA download has yet to occur. The group 105 of IoT devices identified in block 810 may be identified based on the generated schedule for performing the OTA downloads. OTA server 240 retrieves, from IoT devices subscription DB 260, a subscriber ID, a device group ID, one or more device IDs, a device behavior profile 110, and policy rules 120 of the group 105 of IoT devices identified in block 810 (block 820). In an exemplary implementation in which IoT devices subscription DB 260 includes a tabular data structure, OTA server 240 may identify an entry of DB 260 having a device group ID that matches the device group ID of the group 105 identified in block 810. OTA server 240 may then retrieve the entire contents of the identified entry of DB 260, including the subscriber ID, device group ID, one or more device IDs, device behavior profile 110, and policy rules 120 of the group 105 of IoT devices. The exemplary messaging diagram of FIG. 9 depicts OTA server 240 identifying 900 a group of IoT devices for OTA downloading, and retrieving 910, from IoT devices subscription DB 260, a device behavior profile, and policy rules for the group of IoT devices identified for the OTA download.

OTA server 240 pushes the policy management application 125 (block 830) and the device behavior profile 110 and policy rules 120 (block 840) to each IoT device 130 of the group 105 of IoT devices for storage (block 830). OTA server 240 may push policy management application 125, device behavior profile 110, and policy rules 120 to each IoT device 130 of the group 105 by sending the data via public network(s) 220 and wireless network(s) 210. FIG. 9 depicts OTA server 240 pushing 920 the policy management app 125, and pushing 930 the device behavior profile and policy rules, to a single IoT device 130 of the group 105 of IoT devices. The pushing 920 and 930, depicted in FIG. 9, may be repeated for each IoT device 130 within the group 105 of IoT devices.

The exemplary process of FIG. 8 may be repeated for each group 105 of IoT devices 130 for which a usage profile has been created by a subscriber 270 in the exemplary process of FIG. 5.

Figure 10:
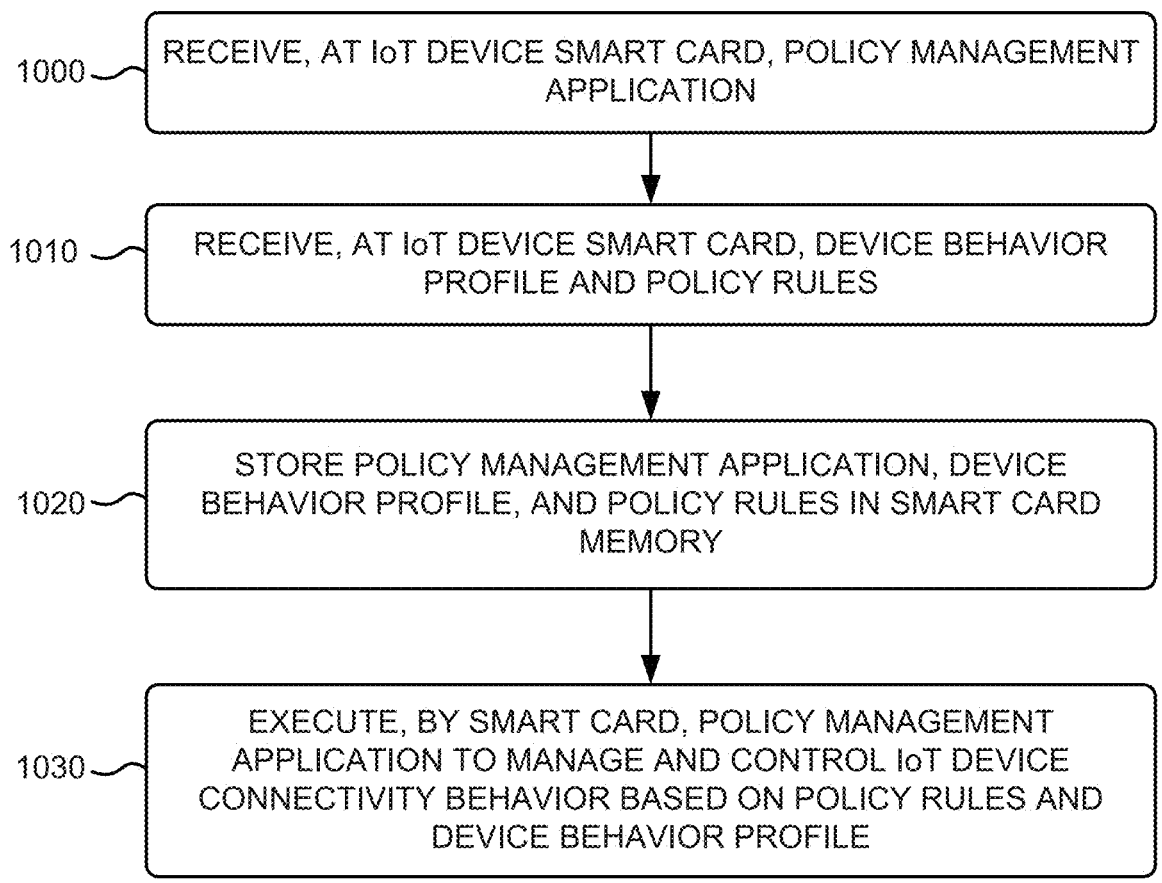
FIG. 10 is a flow diagram illustrating an exemplary process for execution of a policy management application, at an Internet of Things device, to manage and control the device connectivity behavior of the Internet of Things device based on policy rules and/or a device behavior profile.

FIG. 10 is a flow diagram illustrating an exemplary process for execution of a policy management application 125, at an IoT device 130, to manage and control the device connectivity behavior of the IoT device 130 based on policy rules 120 and/or device behavior profile 110. In one implementation, the exemplary process of FIG. 10 may be implemented by smart card 140 of an IoT device 130, in conjunction with transceiver 150. In another implementation, the exemplary process of FIG. 10 may be implemented by processing unit 315 of IoT device 130, in conjunction with transceiver 150, memory 320, ROM 330, and/or storage device 340. The exemplary process of FIG. 10 is described with reference to the diagram of FIG. 11.

Figure 11:
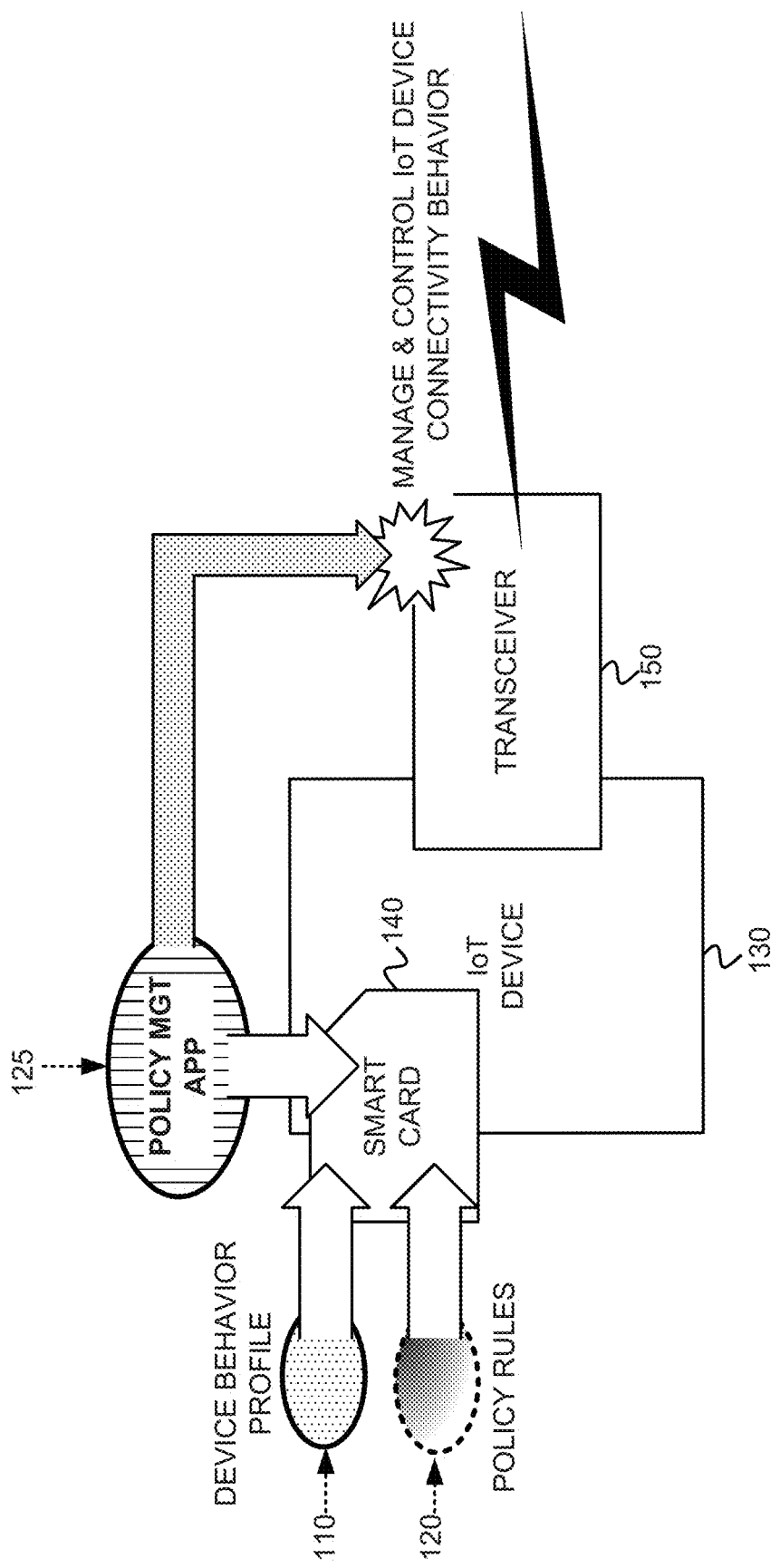
FIG. 11 is a diagram that graphically depicts the process of FIG. 10.

The exemplary process includes IoT device smart card 140 receiving a policy management application 125 (1000), and receiving a device behavior profile 110 and a set of policy rules 120 (block 1010). The policy management application 125 may have been pushed to IoT device 130 from OTA server 240, as described with respect to block 830 of FIG. 8. Additionally, the device behavior profile 110 and the set of policy rules 120 may have been pushed to IoT device 130 from OTA server 240, as described with respect to block 840 of FIG. 8. FIG. 11 depicts policy management application 125, device behavior profile 110, and policy rules 120 being received at smart card 140 of IoT device 130. IoT device smart card 140 stores the policy management application 125, device behavior profile 110, and set of policy rules 120 in memory 420 of smart card 130 (block 1020). Upon receipt at transceiver 150, IoT device 130 may transfer policy management application 125, device behavior profile 110, and policy rules 120, via bus 310 and I/O interface 400, to smart card 140 for storage in memory 420.

Smart card 140 of IoT device 130 executes the policy management application 125 to manage and control IoT device connectivity behavior based on the policy rules 120 and the device behavior profile 110 (block 1030). FIG. 11 graphically depicts the execution of policy management application 125 by smart card 140 to manage and control the connectivity behavior of transceiver 150 of IoT device 130. Management and control of the connectivity behavior of transceiver 150 may include controlling a mode of transceiver 150 (e.g., active mode or sleep mode), managing a power usage of transceiver 150 (e.g., turning off one or more transmitters or receivers), controlling when transceiver 150 attempts to connect to wireless network(s) 210, controlling the reception of data received at transceiver 150 (e.g., when, how much data, and for how long), and/or controlling the transmission of data from transceiver 150 (e.g., when, how much data, and for how long). Specific examples of the use of device behavior profile 110 and policy rules 120 for managing and controlling the connectivity behavior of transceiver 150 of IoT device 130 by policy management application 125 are described below with respect to FIGS. 13 and 14.

The exemplary process of FIG. 10 may be repeated at each IoT device 130 of a group 105 of subscribed IoT devices upon receipt of a policy management application 125, a device behavior profile 110, and policy rules 120.

Figure 12:
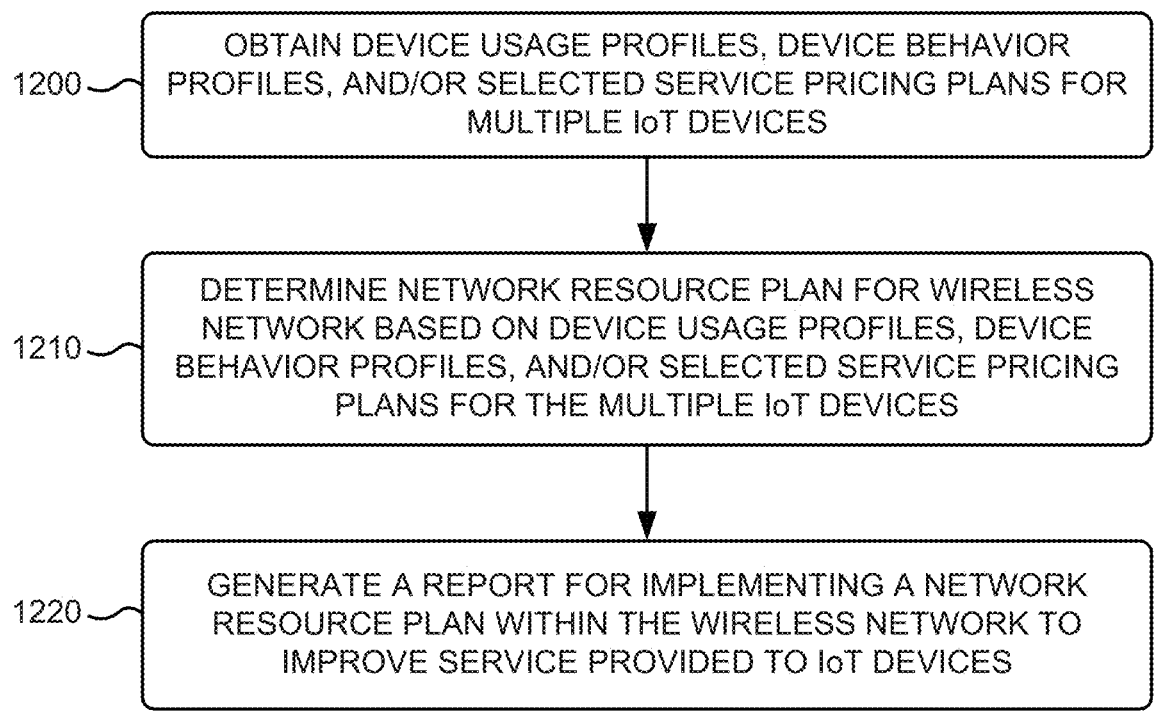
FIG. 12 is a flow diagram illustrating an exemplary process for implementing a network resource plan based on device usage profiles, device behavior profiles, and/or selected service pricing plans for multiple Internet of Things devices.

FIG. 12 is a flow diagram illustrating an exemplary process for implementing a network resource plan based on device usage profiles, device behavior profiles, and/or selected service pricing plans for multiple IoT devices 130. In one implementation, the exemplary process of FIG. 12 may be implemented, either in whole or in part, by subscriber portal server 230. In another implementation, the exemplary process of FIG. 12 may be implemented in part by subscriber portal server 230 (e.g., blocks 1200 and 1210), and in part by one or more employees (e.g., technicians, engineers) of the network provider(s) of wireless network(s) 210.

The exemplary process includes subscriber portal server 230 obtaining device usage profiles, device behavior profiles, and/or selected pricing plans for multiple IoT devices (block 1200). Subscriber portal server 230 may retrieve, from IoT devices subscription DB 260 all of, or a portion of, the usage profiles, device behavior profiles, and/or selected pricing plans for IoT devices 130 having subscriptions stored within the data structure of DB 260.

Subscriber portal server 230 determines a network resource plan for wireless network 210 based on the device usage profiles, the device behavior profiles and/or the selected service pricing plans for the multiple IoT devices (block 1210). Subscriber portal server 230 may analyze all of the various parameters of the usage profiles, device behavior profiles, and/or selected pricing plans for IoT devices 130 that are actively using wireless network(s) 210 and may determine minimum network performance parameters of wireless network(s) 210 for meeting the performance requirements of the IoT devices 130. Based on the determined minimum network performance parameters of wireless network(s) 210, subscriber portal server 230 may determine the location (both geographic and network location) of needed network components, and the types of network components that need to be added, or re-configured, to meet the determined minimum network performance parameters. Subscriber portal server 230 may, for example, determine that additional antenna arrays and/or additional cell towers may need to be added in certain geographic areas of wireless network(s) 210 to satisfy the determined minimum network performance parameters.

Subscriber portal server 230 generates a report for implementing a network resource plan within wireless network 210 to improve service provided to the IoT devices 130 (block 1220). Based on the generated report, subscriber portal server 230 may cause components of wireless network(s) 210, that are already deployed and have the capability of being switched in and out of the network, to be switched into operation within wireless network(s) 210 to implement the network resource plan. Furthermore, the generated report may be used by employees of the network provider(s) of wireless network(s) 210 for manually installing, and switching into operation, certain needed components of the wireless network(s) 210 to implement the network resource plan.

The exemplary process of FIG. 12 may be periodically repeated, or repeated upon demand (e.g., by an administrator of the network provider(s) of wireless network(s) 210), to update the network resource plan based on current usage profiles, device behavior profiles, and/or selected service pricing plans stored within IoT devices subscription DB 260.

Figure 13:
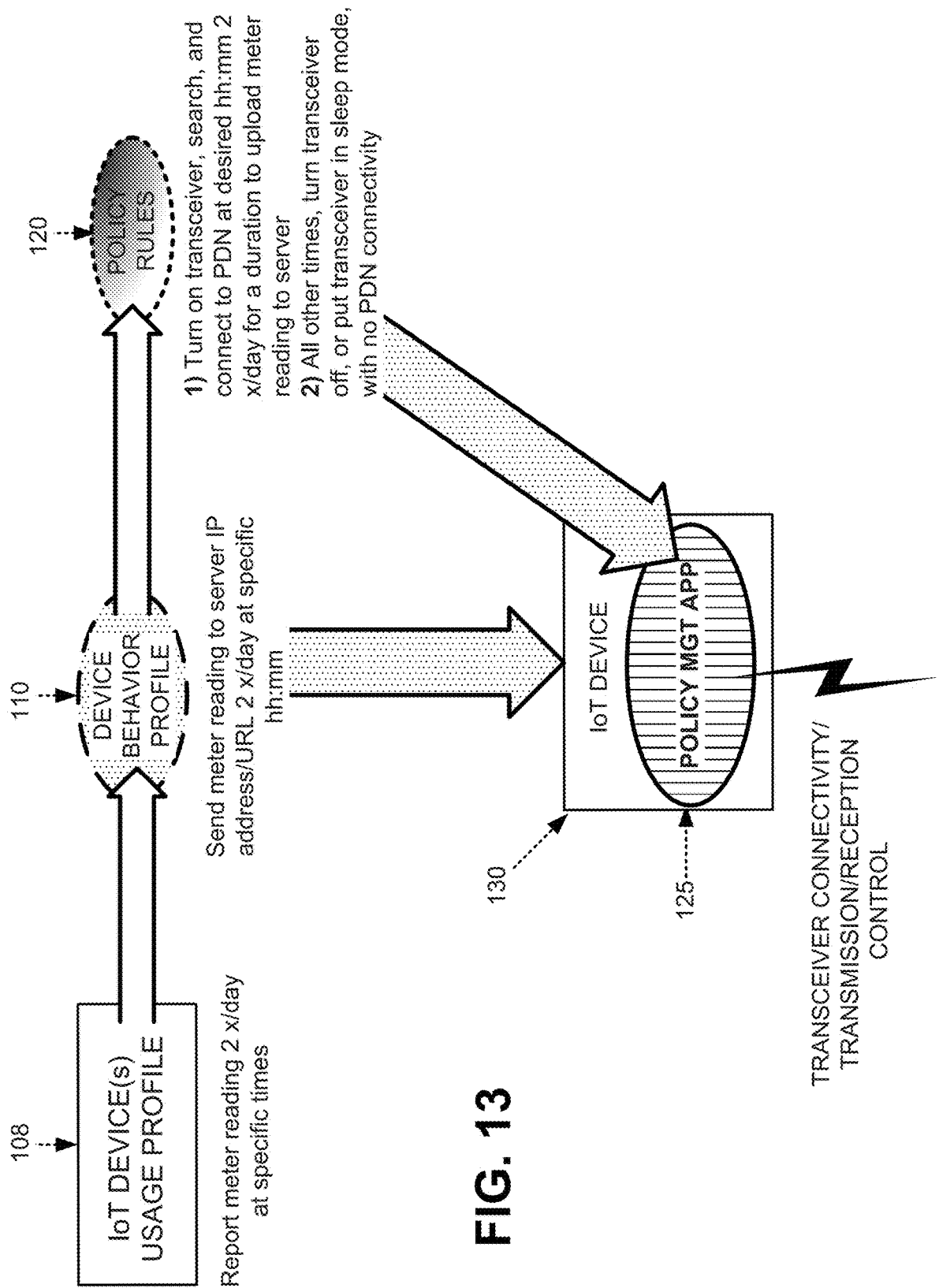
FIG. 13 depicts a simplified example of the generation of a device behavior profile and policy rules based on an Internet of Things device(s) usage profile.

FIG. 13 depicts a simplified example of the generation of a device behavior profile 110 and policy rules 120 based on an IoT device(s) usage profile 108. The simplified example of FIG. 13 involves a group of IoT devices 130 that further includes a group of meters that each transmits meter readings while located at distributed geographic locations. As shown in FIG. 13, an IoT devices usage profile 108 is generated that indicates that each IoT device 130 will report a meter reading twice a day (2×/day) at specified times of 08:00 and 17:00. Based on the usage profile 108, a device behavior profile 110 is generated that indicates that each IoT device 130 should send the meter reading to a server at a particular Internet Protocol (IP) address, or Uniform Resource Locator (URL) at the specified times of 08:00 and 17:00. Specific policy rules 120 may then be generated based on the device behavior profile 110. As shown in FIG. 13, a first policy rule (1) causes policy management application 125 to instruct the transceiver of IoT device 130 to turn on, search and connect to the Packet Data Network (PDN) of wireless network(s) 210 at the desired times of 08:00 and 17:00 for a duration to upload the meter reading to the server at the IP address or URL. As further shown, a second policy rule (2) causes policy management application 125 to instruct the transceiver of IoT device 130, at all times other than 08:00 and 17:00, to turn off, or go into sleep mode, and to disconnect from, or not maintain any connectivity with, the PDN. Policy management application 125 may use the device behavior profile 110, and the set of policy rules 120, for controlling the connectivity, transmission, and reception of the transceiver of each IoT device 130 for which the usage profile 108 was created.

Figure 14:
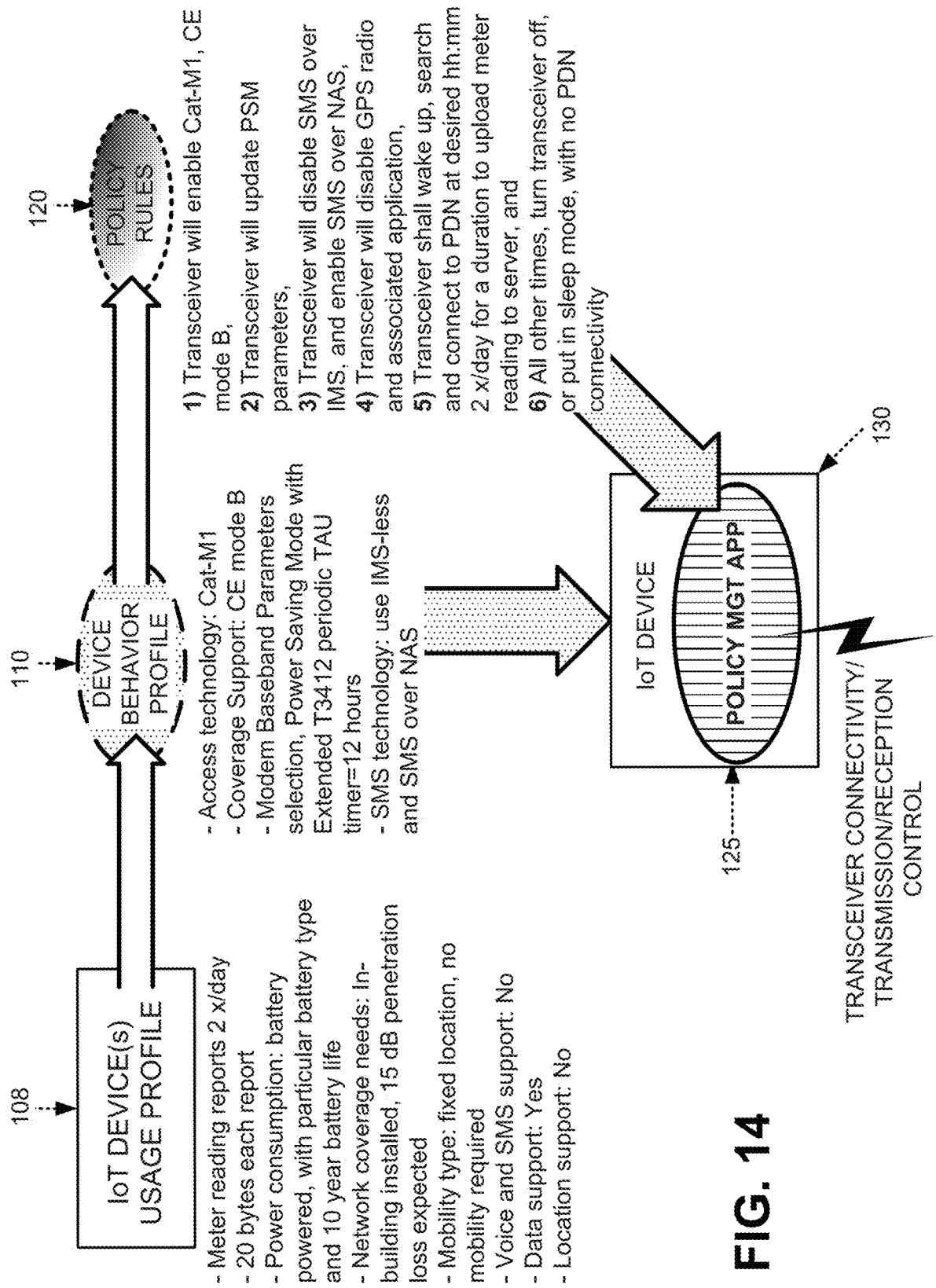
FIG. 14 depicts a more complex example, relative to the simplified example of FIG. 13, of the generation of a device behavior profile and policy rules based on the Internet of Things device(s) usage profile.

FIG. 14 depicts a more complex example, relative to the simplified example of FIG. 13, of the generation of a device behavior profile 110 and policy rules 120 based on an IoT device(s) usage profile 108. The more complex example of FIG. 14 involves, similar to the example of FIG. 13, a group of IoT devices 130 that further includes a group of meters that each transmits meter readings while located at distributed geographic locations. However, in the example of FIG. 14, the subscriber 270 specifies numerous additional parameters via, for example, the subscriber portal UI 100 of FIG. 1A, that detail a more complex usage pattern for the IoT devices 130 than that specified in the usage profile 108 of FIG. 13.

As shown in FIG. 14, the usage profile 108 indicates that the IoT device(s) 130 transmit a meter reading report two times a day, with 20 bytes of data per each report. The usage profile 108 further indicates that the IoT devices 130 are battery powered, with a particular battery type, and a ten year battery life. The usage profile 108 additionally indicates that the IoT devices 130 are installed in-building, with a 15 dB penetration loss expected due to their location within buildings, and each IoT device 130 is located at a fixed location, with no mobility. The usage profile 108 further indicates that the IoT devices 130 do not require either voice, SMS, or location service (e.g., GPS), over wireless network(s) 210, but do require data service.

Based on the usage profile 108 provided by subscriber 270, the device behavior profile 110, shown in FIG. 14, is generated that would provide network service via wireless network(s) 210 which satisfies the requirements of the usage profile 108. Device behavior profile 110 includes a designation of Cat-M1 access—a low power wide-area (LPWA) air interface that permits devices to connect with wireless network(s) 210 using medium data rates. Cat-M1 enables longer battery lifecycles and greater in-building range. Device behavior profile 110 further designates coverage enhancement mode CE mode B, which improves signal penetration into buildings using one or more of subframe repetition, frequency hopping, reference symbol boosting, and an enhanced access channel (e.g., Physical Random Access Channel (PRACH)). Device behavior profile 110 further designates a power saving mode within the modem baseband parameters selection, with an extended T3412 periodic Tracking Area Update (TAU) timer set to 12 hours. The power saving mode enables power consumption savings at the IoT devices 130 with the power saving timer period being 12 hours during which the IoT device 130 enters its lowest power mode, and does not transmit data. Device behavior profile 110 additionally designates the use of IMS-less and SMS over NAS, in which SMS messages are carried in Non-Access Stratum (NAS) messages between the Mobility Management Entity (MME) and the IoT devices 130.

Based on the usage profile 108, and the device behavior profile 110, the policy rules 120 are generated that will be used by policy management application 125 to control the connectivity of transceiver 150 of each IoT device 130. As depicted in FIG. 14, the first rule (1) of policy rules 120 requires transceiver 150 to enable the Cat-M1, and CE mode B, and the second rule (2) requires transceiver 150 to update the power saving mode (PSM) parameters. The third rule (3) requires transceiver 150 to disable SMS over IMS, and to enable SMS over NAS, and the fourth rule (4) requires transceiver 150 to disable GPS radio and the associated GPS application. The fifth rule (5) requires transceiver 150 to wake up, search, and connect to the PDN at the desired time, twice a day, for a particular duration, to upload the meter reading to the server, and the sixth rule (6) requires transceiver 150 to disconnect from the PDN, and turn off or go into a sleep mode, at all other times outside of the twice a day transmission. The policy rules 120, in some circumstances, may not tear down the PDN connection between data transfers, since tearing down and setting up PDN connection between the data transfers requires additional signaling overhead. As shown in FIG. 14, policy management application 125, executing at IoT device 130, uses the device behavior profile 110, and the set of policy rules 120, described above for controlling the connectivity, transmission activity, and reception activity of the transceiver of IoT device 13.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 8, 10, and 12, and message/operation flows with respect to FIGS. 7, 9, and 11, the order of the blocks and/or message/operation flows may be varied in other implementations.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving parameters corresponding to a usage profile of at least one Internet of Things (IoT) device, wherein the usage profile specifies a data usage pattern corresponding to the at least one IoT device transmitting or receiving data via a wireless network;
    generating one or more service pricing plans for the at least one IoT device to receive wireless service from the wireless network, wherein the one or more service pricing plans are based on the parameters corresponding to the usage profile and a network cost corresponding to supporting services required by the parameters corresponding to the usage profile;
    receiving a selection of a service pricing plan of the one or more service pricing plans;
    generating a device behavior profile based on the parameters corresponding to the usage profile and the service pricing plan;
    generating a set of policy rules, wherein the set of policy rules includes rules to be applied by an application based on the device behavior profile and the service pricing plan, and wherein the set of policy rules causes the application, when executed, to set network connectivity parameters at a transceiver of the at least one IoT device based on the device behavior profile and the service pricing plan; and
    sending the device behavior profile, the application, and the set of policy rules to the at least one IoT device, wherein the application is executed by a smart card on the at least one IoT device based on the device behavior profile and the set of policy rules.

2. The method of claim 1, further comprising:
    receiving a subscriber request to register the at least one IoT device for wireless service via the wireless network; and presenting a user interface to a subscriber that permits the subscriber to provide the parameters corresponding to the usage profile.

3. The method of claim 1, wherein the parameters corresponding to the usage profile include parameters specifying at least one of:
a transmission or reception data quantity,
one or more transmission or reception times,
a data transmission or reception frequency,
a mobility characteristic,
a device power characteristic, or
a wireless network service requirement.

4. The method of claim 1, wherein the at least one IoT device comprises a plurality of IoT devices, and
wherein sending the device behavior profile, the application, and the set of policy rules comprises sending the device behavior profile, the application, and the set of policy rules to the plurality of IoT devices.

5. The method of claim 4, wherein the plurality of IoT devices comprise IoT devices that perform similar functions, or that have a same or similar data usage pattern for transmitting or receiving data via the wireless network.

6. The method of claim 4, further comprising:
receiving an identifier associated with the plurality of IoT devices; and
storing the identifier and the device behavior profile in a database.

7. The method of claim 1, further comprising:
storing the device behavior profile and the set of policy rules in a database.

8. A network device, comprising:
a communication interface configured to connect to a wired network or to a wireless network and to receive parameters corresponding to a usage profile of at least one Internet of Things (IoT) device, wherein the usage profile specifies a data usage pattern corresponding to the at least one IoT device transmitting or receiving data via a wireless network;
a memory storing instructions; and
a processing unit coupled to the communication interface, and configured to execute the instructions to:
generate one or more service pricing plans for the at least one IoT device to receive wireless service from the wireless network, wherein the one or more service pricing plans are based on the parameters corresponding to the usage profile and a network cost corresponding to supporting services required by the parameters corresponding to the usage profile,
receive a selection of a service pricing plan of the one or more service pricing plans,
generate a device behavior profile based on the parameters corresponding to the usage profile and the service pricing plan,
generate a set of policy rules, wherein the set of policy rules includes rules to be applied by an application based on the device behavior profile and the service pricing plan, and wherein the set of policy rules causes the application, when executed, to set network connectivity parameters at a transceiver of the at least one IoT device based on the device behavior profile and the service pricing plan, and
cause the device behavior profile, the application, and the set of policy rules to be sent to the at least one IoT device, wherein the application is executed by a smart card on the at least one IoT device based on the device behavior profile and set of policy rules.

9. The network device of claim 8, wherein the communication interface is further configured to:
receive a subscriber request to register the at least one IoT device for wireless service via the wireless network, and
wherein the processing unit is further configured to execute the instructions to:
cause a user interface to be sent to a subscriber, wherein the user interface permits the subscriber to provide the parameters corresponding to the usage profile.

10. The network device of claim 8, wherein the parameters corresponding to the usage profile include parameters specifying at least one of:
a transmission or reception data quantity,
one or more transmission or reception times,
a data transmission or reception frequency,
a mobility characteristic,
a device power characteristic, or
a wireless network service requirement.

11. The network device of claim 8, wherein the at least one IoT device comprises a plurality of IoT devices, and
wherein causing the device behavior profile, the application, and the set of policy rules to be sent comprises causing the device behavior profile, the application, and the set of policy rules to be sent to the plurality of IoT devices, and wherein the plurality of IoT devices comprise IoT devices that perform similar functions, or that have a same or similar data usage pattern for transmitting or receiving data via the wireless network.

12. The network device of claim 8, wherein the processing unit is further configured to execute the instructions to:
cause the device behavior profile and the set of policy rules to be stored in a database.

13. A non-transitory storage medium storing instructions executable by a processing unit associated with a network device, wherein the instructions comprise instructions to cause the processing unit to:
receive parameters corresponding to a usage profile of at least one Internet of Things (IoT) device, wherein the usage profile specifies a data usage pattern corresponding to the at least one IoT device transmitting or receiving data via a wireless network;
generate one or more service pricing plans for the at least one IoT device to receive wireless service from the wireless network, wherein the one or more service pricing plans are based on the parameters corresponding to the usage profile and a network cost corresponding to supporting services required by the parameters corresponding to the usage profile;
receive a selection of a service pricing plan of the one or more service pricing plans;
generate a device behavior profile based on the parameters corresponding to the usage profile and the service pricing plan;
generate a set of policy rules, wherein the set of policy rules includes rules to be applied by an application based on the device behavior profile and the service pricing plan, and wherein the set of policy rules causes the application, when executed, to set network connectivity parameters at a transceiver of the at least one IoT device based on the device behavior profile and the service pricing plan; and
cause the device behavior profile, the application, and the set of policy rules to be sent to the at least one IoT device, wherein the application is executed by a smart card on the at least one IoT device based on the device behavior profile and set of policy rules.

14. The non-transitory storage medium of claim 13, wherein the instructions comprise instructions to cause the processing unit to:
- receive a subscriber request to register the at least one IoT device for wireless service via the wireless network; and
- present a user interface to a subscriber that permits the subscriber to provide the parameters corresponding to the usage profile.

15. The non-transitory storage medium of claim 13, wherein the parameters corresponding to the usage profile include parameters specifying at least one of:
- a transmission or reception data quantity,
- one or more transmission or reception times,
- a data transmission or reception frequency,
- a mobility characteristic,
- a device power characteristic, or
- a wireless network service requirement.

16. The network device of claim 11, wherein the processing unit is further configured to execute the instructions to:
- receive an identifier associated with the plurality of IoT devices; and
- store the identifier and the device behavior profile in a database.

17. The non-transitory storage medium of claim 13, wherein the at least one IoT device comprises a plurality of IoT devices, and
- wherein the instructions to cause the processing unit to cause the device behavior profile, the application, and the set of policy rules to be sent to the at least one IoT device comprise instructions to cause the processing unit to cause the device behavior profile, the application, and the set of policy rules to be sent to the plurality of IoT devices.

18. The non-transitory storage medium of claim 17, wherein the plurality of IoT devices comprise IoT devices that perform similar functions, or that have a same or similar data usage pattern for transmitting or receiving data via the wireless network.

19. The method of claim 1, wherein generating the one or more service pricing plans comprises generating the one or more service pricing plans based on at least one of:
- a transmission or reception data quantity,
- one or more transmission or reception times,
- a data transmission or reception frequency,
- a mobility characteristic,
- a device power characteristic, or
- a wireless network service requirement.

20. The network device of claim 8, wherein, when generating the one or more service pricing plans, the processing unit is further configured to execute the instructions to generate the one or more service pricing plans based on at least one of:
- a transmission or reception data quantity,
- one or more transmission or reception times,
- a data transmission or reception frequency,
- a mobility characteristic,
- a device power characteristic, or
- a wireless network service requirement.

* * * * *